United States Patent
Kumar et al.

(10) Patent No.: US 12,402,089 B2
(45) Date of Patent: Aug. 26, 2025

(54) TECHNIQUES FOR PERFORMING TRACKING USING A PHYSICAL BROADCAST CHANNEL

(71) Applicant: QUALCOMM Incorporated, San Diego, CA (US)

(72) Inventors: Ravinder Kumar, Meham (IN); Swarupa Gandhi Vudata, Hyderabad (IN); Vishnu Namboodiri Karakkad Kesavan Namboodiri, Hyderabad (IN); Mahendran Kamatchi, Hyderabad (IN); Shivaprasad Boora, Rajanna Sircilla (IN)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/388,839

(22) Filed: Jul. 29, 2021

(65) Prior Publication Data

US 2023/0037028 A1 Feb. 2, 2023

(51) Int. Cl.
*H04W 56/00* (2009.01)
*H04L 5/00* (2006.01)

(52) U.S. Cl.
CPC ......... *H04W 56/001* (2013.01); *H04L 5/0044* (2013.01); *H04L 5/0082* (2013.01)

(58) Field of Classification Search
CPC ... H04L 5/0048; H04L 5/0044; H04L 5/0082; H04L 5/005; H04L 5/0053; H04L 5/0087; H04W 56/00; H04W 56/0015; H04W 56/001

See application file for complete search history.

(56) References Cited

U.S. PATENT DOCUMENTS

| | | | | |
|---|---|---|---|---|
| 11,206,624 B2* | 12/2021 | Ko | | H04L 5/0053 |
| 11,343,783 B2* | 5/2022 | Ko | | H04J 11/0079 |
| 2011/0026645 A1* | 2/2011 | Luo | | H04L 1/0038 |
| | | | | 455/226.1 |
| 2011/0228883 A1* | 9/2011 | Liu | | H04L 1/08 |
| | | | | 375/340 |
| 2017/0353257 A1* | 12/2017 | Islam | | H04W 56/0035 |
| 2019/0150068 A1* | 5/2019 | Montojo | | H04L 5/0046 |
| | | | | 370/329 |
| 2022/0353829 A1* | 11/2022 | Zarifi | | H04L 5/0048 |

FOREIGN PATENT DOCUMENTS

| | | | | |
|---|---|---|---|---|
| CN | 112954796 A | * | 6/2021 | ........... H04L 5/0053 |
| WO | WO-2018137466 A1 | * | 8/2018 | |
| WO | WO-2020231161 A1 | * | 11/2020 | ........... H04B 7/2656 |

* cited by examiner

*Primary Examiner* — Andrew W Chriss
(74) *Attorney, Agent, or Firm* — Holland & Hart LLP/Qualcomm

(57) ABSTRACT

Methods, systems, and devices for wireless communications are described. A user equipment (UE) may decode a first signal received over a broadcast channel during a first synchronization signal block (SSB) occasion to identify a first payload, and determine one or more expected changes between the first payload and a second payload of a second signal expected to be received over the broadcast channel during a second SSB occasion. The UE may update the first payload with the one or more expected changes to determine an updated first payload, and encode the updated first payload as an updated first signal. The UE may receive the second signal over the broadcast channel during the second SSB occasion, and apply the second signal and the updated first signal to a tracking procedure for the UE.

30 Claims, 17 Drawing Sheets

PBCH payload 210

| Bit Number | Payload for First Frequency Range | Payload for Second Frequency Range |
|---|---|---|
| 30-31 | | |
| 29 | | |
| 28 | | |
| 24-27 | | |
| 23 | | |
| 22 | | |
| 21 | | |
| 13-20 | | |
| 12 | | |
| 8-11 | | |
| 7 | | |
| 1-6 | | |
| 0 | | |

☐ Semi-static

☐ Dynamic

☐ Spare/Reserved

TECHNIQUES FOR PERFORMING TRACKING USING A PHYSICAL BROADCAST CHANNEL

FIELD OF TECHNOLOGY

The following relates to wireless communications, including techniques for performing tracking using a physical broadcast channel (PBCH).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to perform a tracking procedure with one or more other devices to improve performance of communications with the one or more other devices. In some cases, a UE may perform synchronization signal block (SSB) tracking in which the UE may track communication parameters based on one or more signals received in an SSB occasion. Techniques for performing SSB tracking procedures may be improved.

SUMMARY

The described techniques relate to improved methods, systems, devices, and apparatuses that support techniques for performing tracking using a physical broadcast channel (PBCH). Generally, the described techniques provide for improved techniques for performing SSB tracking by a device. In some implementations, a user equipment (UE) may perform one or more tracking procedures based on signals received during an SSB occasion. The UE may be configured to perform the one or more tracking procedures based on a PBCH payload received during the SSB occasion. As a PBCH payload may change over time, the UE may be configured with techniques for identifying changes in the PBCH payload. Based on the identified changes, the UE may re-encode a previously received PBCH payload to match the future (e.g., changed) PBCH payload. The UE may compare the re-encoded payload to the changed PBCH payload to track one or more communication parameters associated with the PBCH payloads over time, frequency, etc. For example, a UE may decode a first signal received over a broadcast channel during a first SSB occasion to identify a first payload, and determine one or more expected changes between the first payload and a second payload of a second signal expected to be received over the broadcast channel during a second SSB occasion. The UE may update the first payload with the one or more expected changes to determine an updated first payload, and encode the updated first payload as an updated first signal. The UE may receive the second signal over the broadcast channel during the second SSB occasion, and apply the second signal and the updated first signal to a tracking procedure for the UE.

A method for wireless communications at a UE is described. The method may include decoding a first signal received over a broadcast channel during a first synchronization signal block occasion to identify a first payload, determining one or more expected changes between the first payload and a second payload of a second signal expected to be received over the broadcast channel during a second synchronization signal block occasion, updating the first payload with the one or more expected changes to determine an updated first payload, encoding the updated first payload as an updated first signal, receiving the second signal over the broadcast channel during the second synchronization signal block occasion, and applying the second signal and the updated first signal to a tracking procedure for the UE.

An apparatus for wireless communications is described. The apparatus may include a processor, memory coupled with the processor, and instructions stored in the memory. The instructions may be executable by the processor to cause the apparatus to decode a first signal received over a broadcast channel during a first synchronization signal block occasion to identify a first payload, determine one or more expected changes between the first payload and a second payload of a second signal expected to be received over the broadcast channel during a second synchronization signal block occasion, update the first payload with the one or more expected changes to determine an updated first payload, encode the updated first payload as an updated first signal, receive the second signal over the broadcast channel during the second synchronization signal block occasion, and apply the second signal and the updated first signal to a tracking procedure for the UE.

Another apparatus for wireless communications is described. The apparatus may include means for decoding a first signal received over a broadcast channel during a first synchronization signal block occasion to identify a first payload, means for determining one or more expected changes between the first payload and a second payload of a second signal expected to be received over the broadcast channel during a second synchronization signal block occasion, means for updating the first payload with the one or more expected changes to determine an updated first payload, means for encoding the updated first payload as an updated first signal, means for receiving the second signal over the broadcast channel during the second synchronization signal block occasion, and means for applying the second signal and the updated first signal to a tracking procedure for the UE.

A non-transitory computer-readable medium storing code for wireless communications is described. The code may include instructions executable by a processor to decode a first signal received over a broadcast channel during a first synchronization signal block occasion to identify a first payload, determine one or more expected changes between the first payload and a second payload of a second signal expected to be received over the broadcast channel during a second synchronization signal block occasion, update the first payload with the one or more expected changes to determine an updated first payload, encode the updated first payload as an updated first signal, receive the second signal over the broadcast channel during the second synchronization signal block occasion, and apply the second signal and the updated first signal to a tracking procedure for the UE.

In some examples of the method, apparatuses, and non-transitory computer-readable medium described herein, determining the one or more expected changes may include operations, features, means, or instructions for determining the one or more expected changes with respect to spare bits or reserved bits in the first payload in accordance with a rule.

In some examples of the method, apparatuses, and non-transitory computer-readable medium described herein, determining the one or more expected changes with respect to spare bits or reserved bits in the first payload may include operations, features, means, or instructions for receiving a message, in accordance with the rule, indicating new values of the spare bits or reserved bits, the new values to be included in the second payload and representative of the one or more expected changes with respect to spare bits or reserved bits.

In some examples of the method, apparatuses, and non-transitory computer-readable medium described herein, determining the one or more expected changes with respect to spare bits or reserved bits in the first payload may include operations, features, means, or instructions for predicting, in accordance with the rule, new values of the spare bits or reserved bits, the new values to be included in the second payload and representative of the one or more expected changes with respect to spare bits or reserved bits.

In some examples of the method, apparatuses, and non-transitory computer-readable medium described herein, the rule requires that changes with respect to spare bits or reserved bits in broadcast channels of subsequent synchronization signal block occasions be predictable.

In some examples of the method, apparatuses, and non-transitory computer-readable medium described herein, determining the one or more expected changes may include operations, features, means, or instructions for determining that values of spare bits or reserved bits do not change from the first payload to the second payload as a result of the first payload and the second payload being within a same periodic time interval and in accordance with a rule where the values of spare bits or reserved bits in broadcast channels of synchronization signal blocks may be only allowed to change at a beginning of a periodic time interval.

In some examples of the method, apparatuses, and non-transitory computer-readable medium described herein, decoding the first signal may include operations, features, means, or instructions for determining that the first synchronization signal block occasion occurs at an initial boundary of the periodic time interval and decoding the first signal received during the first synchronization signal block occasion based on the first synchronization signal block occasion occurring at the initial boundary of the periodic time interval in accordance with the rule.

Some examples of the method, apparatuses, and non-transitory computer-readable medium described herein may further include operations, features, means, or instructions for determining that the second synchronization signal block occasion occurs after the first synchronization signal block occasion but within the periodic time interval and refraining from decoding the second signal received during the second synchronization signal block occasion based on the second synchronization signal block occasion occurring after the first synchronization signal block occasion but within the periodic time interval in accordance with the rule.

Some examples of the method, apparatuses, and non-transitory computer-readable medium described herein may further include operations, features, means, or instructions for receiving an indication of a rule via radio resource control signaling, medium access control element signaling, downlink control information signaling, or a combination thereof, where the rule pertains to determination of the one or more expected changes with respect to spare bits or reserved bits in the first payload.

Some examples of the method, apparatuses, and non-transitory computer-readable medium described herein may further include operations, features, means, or instructions for identifying a rule that pertains to determination of the one or more expected changes with respect to spare bits or reserved bits in the first payload, where the UE may be preconfigured with the rule.

In some examples of the method, apparatuses, and non-transitory computer-readable medium described herein, the tracking procedure may be a frequency tracking loop procedure, a time tracking loop procedure, a projected energy tracking procedure, a power delay profile estimation procedure, a doppler spread estimation procedure, a delay spread estimation procedure, or a combination thereof.

A method for wireless communications at a base station is described. The method may include transmitting a first signal over a broadcast channel during a first synchronization signal block occasion, the first signal including a first payload having one or more spare bits or reserved bits having first values, generating a second payload for inclusion in a second signal to be transmitted over the broadcast channel during a second synchronization signal block occasion subsequent to the first synchronization signal block occasion, where the second payload includes second values for the one or more spare bits or reserved bits, and where a change from the first values to the second values is in accordance with a rule, and transmitting the second signal over the broadcast channel during the second synchronization signal block occasion.

An apparatus for wireless communications is described. The apparatus may include a processor, memory coupled with the processor, and instructions stored in the memory. The instructions may be executable by the processor to cause the apparatus to transmit a first signal over a broadcast channel during a first synchronization signal block occasion, the first signal including a first payload having one or more spare bits or reserved bits having first values, generate a second payload for inclusion in a second signal to be transmitted over the broadcast channel during a second synchronization signal block occasion subsequent to the first synchronization signal block occasion, where the second payload includes second values for the one or more spare bits or reserved bits, and where a change from the first values to the second values is in accordance with a rule, and transmit the second signal over the broadcast channel during the second synchronization signal block occasion.

Another apparatus for wireless communications is described. The apparatus may include means for transmitting a first signal over a broadcast channel during a first synchronization signal block occasion, the first signal including a first payload having one or more spare bits or reserved bits having first values, means for generating a second payload for inclusion in a second signal to be transmitted over the broadcast channel during a second synchronization signal block occasion subsequent to the first synchronization signal block occasion, where the second payload includes second values for the one or more spare bits or reserved bits, and where a change from the first values to the second values is in accordance with a rule, and means for transmitting the second signal over the broadcast channel during the second synchronization signal block occasion.

A non-transitory computer-readable medium storing code for wireless communications is described. The code may include instructions executable by a processor to transmit a first signal over a broadcast channel during a first synchronization signal block occasion, the first signal including a first payload having one or more spare bits or reserved bits having first values, generate a second payload for inclusion in a second signal to be transmitted over the broadcast channel during a second synchronization signal block occasion subsequent to the first synchronization signal block occasion, where the second payload includes second values for the one or more spare bits or reserved bits, and where a change from the first values to the second values is in accordance with a rule, and transmit the second signal over the broadcast channel during the second synchronization signal block occasion.

In some examples of the method, apparatuses, and non-transitory computer-readable medium described herein, generating the second payload may include operations, features, means, or instructions for determining the second values for the one or more spare bits or reserved bits in accordance with the rule, where the rule may be that changes to values of the one or more spare bits or reserved bits may be announced via one or more messages transmitted by the base station.

Some examples of the method, apparatuses, and non-transitory computer-readable medium described herein may further include operations, features, means, or instructions for transmitting the one or more messages announcing the changes to the values of the one or more spare bits or reserved bits.

In some examples of the method, apparatuses, and non-transitory computer-readable medium described herein, generating the second payload may include operations, features, means, or instructions for determining the second values for the one or more spare bits or reserved bits in accordance with the rule, where the rule may be that changes to values of the one or more spare bits or reserved bits between subsequent synchronization system block occasions may be predictable.

In some examples of the method, apparatuses, and non-transitory computer-readable medium described herein, generating the second payload may include operations, features, means, or instructions for determining the second values for the one or more spare bits or reserved bits in accordance with the rule, where the rule may be that changes to values of the one or more spare bits or reserved bits only occur at boundaries of periodic time intervals.

In some examples of the method, apparatuses, and non-transitory computer-readable medium described herein, the second values for the one or more spare bits or reserved bits may be the first values for the one or more spare bits or reserved bits, as a result of the first synchronization signal block occasion and the second synchronization signal block occasion being both within a same periodic time interval.

Some examples of the method, apparatuses, and non-transitory computer-readable medium described herein may further include operations, features, means, or instructions for transmitting an indication of the rule via radio resource control signaling, medium access control element signaling, downlink control information signaling, or a combination thereof, where the rule pertains to determination by a UE of changes between the first values for the one or more spare bits or reserved bits and the second values for the one or more spare bits or reserved bits.

BRIEF DESCRIPTION OF THE DRAWINGS

FIG. 4 illustrates an example of a PBCH payload bit assignment that supports techniques for performing tracking using a PBCH in accordance with aspects of the present disclosure.

DETAILED DESCRIPTION

Figure 1:
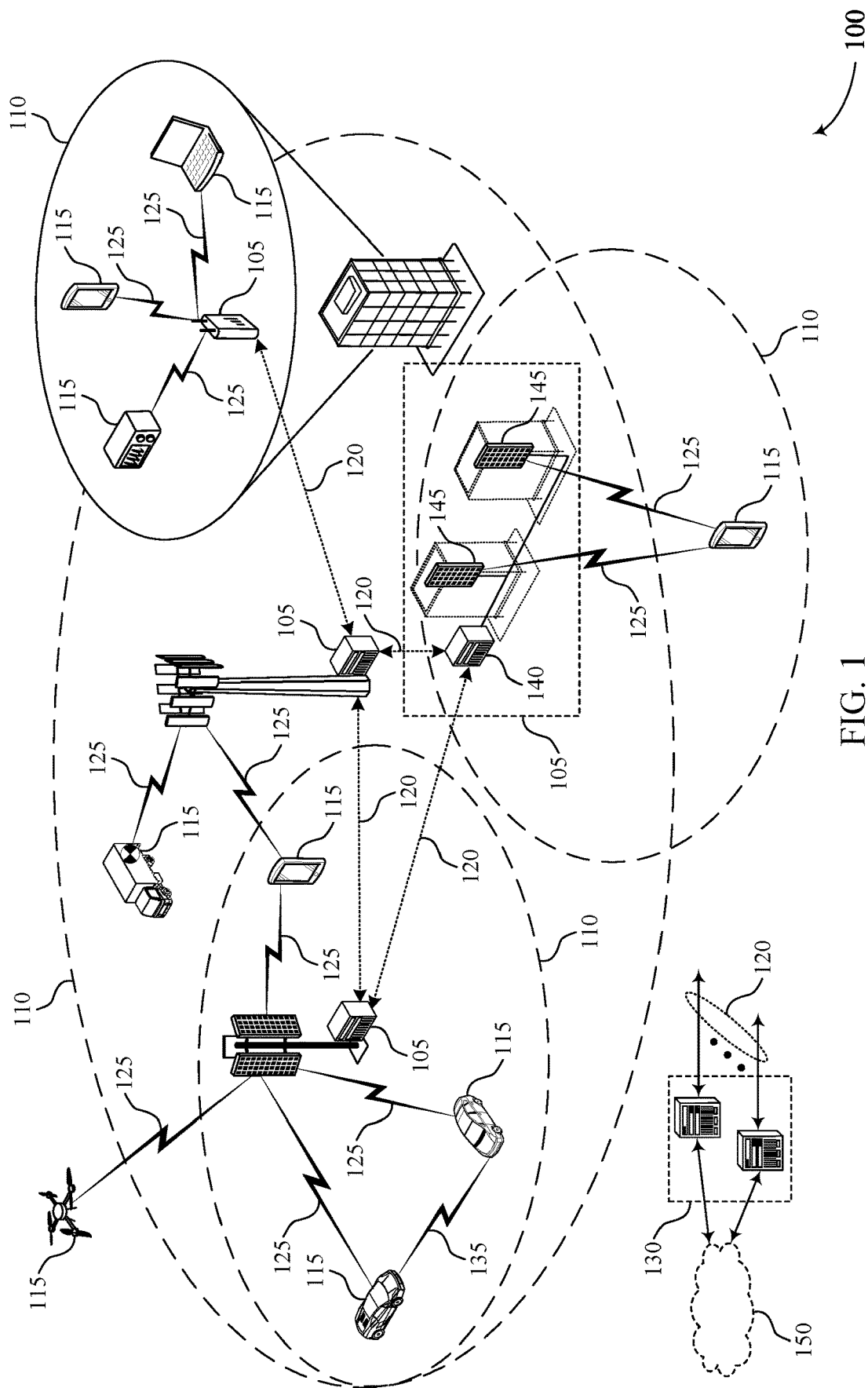
FIG. 1 illustrates an example of a wireless communications system that supports techniques for performing tracking using a physical broadcast channel (PBCH) in accordance with aspects of the present disclosure.

A user equipment (UE) and a base station may perform one or more tracking procedures to improve the performance of the UE. For example, a UE may be configured to perform synchronization signal block (SSB) tracking in which the UE may receive demodulation reference signal (DMRS) and/or secondary synchronization signal (SSS) tones of an SSB. DMRS and SSS tones may not change from one SSB occasion to another, and as such, the UE may compare the received DMRS and/or SSB tones of a first SSB occasion to a second SSB occasion to track how one or more communications parameters are changing over time, frequency, etc. In some cases, a UE may use a physical broadcast channel (PBCH) payload for tracking purposes so as to further improve the performance of the UE. A PBCH payload may include semi-static bits, dynamic bits, spare bits, reserved bits, or a combination thereof. If the semi-static bits or the dynamic bits change from one SSB occasion to another, the UE may receive an indication of the change, or the UE may predict the change to re-encode a received SSB transmission to match the change so that the UE may compare the re-encoded SSB to a future SSB that includes the change. Some implementations may not provide the UE with a method of determining if and how spare and/or reserved bits are changing and as such, the UE may be unable to determine if (or how) the spare and/or reserved bits change from one SSB occasion to the next. In such cases, the UE may be unable to perform tracking procedures with a PBCH payload that results in unreliable information.

To improve tracking procedures using a PBCH payload, the UE may be configured to determine whether one or more spare and/or reserved bits of a PBCH payload are changing from one SSB occasion to another based on an indication of the change or in accordance with a defined parameter. In one example, the defined parameter may constrain spare and/or reserved bits to change statically and/or semi-statically. Accordingly, when the spare and/or reserved bits change, the UE may receive signaling indicating such a change. The UE may then account for the change in the tracking procedure. In another example, the defined parameter may constrain spare and/or reserved bits to change at periodic boundaries. In such cases, the UE may not predict how the spare and/or reserved bits are changing but may anticipate changes to occur periodically. Accordingly, the UE may decode each SSB transmission that is received at a periodic boundary to determine the changed PBCH payload, and the UE may use the decoded SSB transmission for the tracking procedure up to the next periodic boundary. In another example, the defined parameter may constrain changes in the spare and/or reserved bits to be deterministic by the UE, such that the UE may be able to detect any change in the spare and/or reserved bits and perform the tracking procedure accordingly.

Particular aspects of the subject matter described herein may be implemented to realize one or more advantages. The described techniques may support improvements in performing a tracking procedure by a device using a PBCH payload by configuring the device with techniques for identifying changes made to the PBCH payload. The described techniques may improve reliability, improve performance of the device, and increase efficiency in the use of resources, among other advantages. As such, supported techniques may include improved network operations and, in some examples, may promote network efficiencies, among other benefits.

Aspects of the disclosure are initially described in the context of wireless communications systems. Aspects are then described with reference to an SSB occasion, a PBCH payload bit assignment, and a process flow. Aspects of the disclosure are further illustrated by and described with reference to apparatus diagrams, system diagrams, and flowcharts that relate to techniques for performing tracking using a PBCH.

FIG. 1 illustrates an example of a wireless communications system 100 that supports techniques for performing tracking using a PBCH in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may decode a first signal received over a broadcast channel during a first SSB occasion to identify a first payload, and determine one or more expected changes between the first payload and a second payload of a second signal expected to be received over the broadcast channel during a second SSB occasion. The UE 115 may update the first payload with the one or more expected changes to determine an updated first payload, and encode the updated first payload as an updated first signal. The UE 115 may receive the second signal over the broadcast channel during the second SSB occasion, and apply the second signal and the updated first signal to a tracking procedure for the UE 115.

Figure 2:
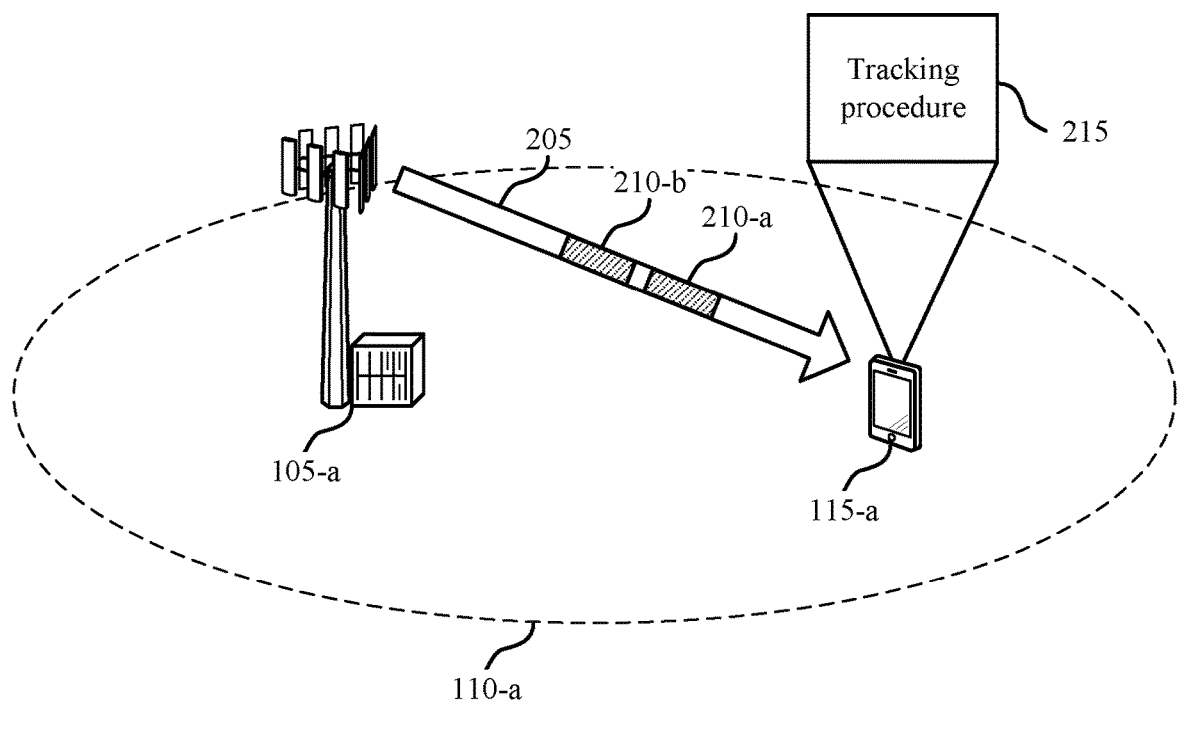
FIG. 2 illustrates an example of a wireless communications system that supports techniques for performing tracking using a PBCH in accordance with aspects of the present disclosure.

FIG. 2 illustrates an example of a wireless communications system 200 that supports techniques for performing tracking using a PBCH in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, UE 115-a may implement a bit change determination procedure for performing tracking of one or more communication parameters between UE 115-a and base station 105-a. Additionally or alternatively, other wireless devices, such as base station 105-a, may implement a same or similar procedure to determine changes made from one payload to another.

Base station 105-a may serve one or more devices, such as UE 115-a. For example, UE 115-a and base station 105-a may communicate via communication links 205 (e.g., beams, channels). UE 115-a may transmit one or more messages (e.g., control messages, data messages) to base station 105-a via a communication link 205 (e.g., an uplink communication link) and base station 105-a may transmit one or more messages (e.g., control messages, data messages) to UE 115-a via a communication link 205 (e.g., a downlink communication link). In some cases, communication parameters may change over time. For example, UE 115-a may move around geographic coverage area 110-a, objects may move around UE 115-a and base station 105-a that may impact communications between UE 115-a and base station 105-a, the environment (e.g., weather) may change, etc. To maintain reliable communications with base station 105-a, UE 115-a may perform one or more tracking procedures to track the change of communication parameters (e.g., time synchronization, frequency synchronization, power, energy, doppler spread, delay spread). For example, UE 115-a may track the communication parameters using a Frequency Tracking Loop (FTL), a Time Tracking Loops (TTL), Projected Energy Tracking (PETL), a Power Delay Profile (PDP), Doppler spread estimation, Delay Spread Estimation. etc. Upon determining a change in one or more of the communication parameters (e.g., any change, a change above a threshold), UE 115-a and base station 105-a may perform synchronization procedures to adjust the communication parameters being used by UE 115-a and base station 105-a.

In some implementations, UE 115-a may perform SSB tracking in which UE 115-a may receive demodulation reference signals (DMRSs) and/or secondary synchronization signals (SSSs) of subsequent SSBs. DMRS and SSS tones may be constant from one SSB occasion to another, and as such, UE 115-a may compare the received DMRS and/or SSS tones of a first SSB occasion to those of a second SSB occasion to determine whether to update time resources, frequency resource, etc.

In some cases, UE 115-a may be configured to use a PBCH payload of subsequent SSBs for tracking purposes. However, a PBCH payload may change from SSB occasion to SSB occasion. As such, to use the PBCH payload for tracking purposes, the PBCH payload may be configured to change in a way that is predictable to the UE 115 (e.g., in accordance with a rule), or the PBCH may change in a way that the UE 115 may receive an indication of the change. Accordingly, the UE 115 may receive and decode a first PBCH in a first SSB occasion. The UE 115 may identify a change to one or more bits of the PBCH that will be received in a second SSB occasion. To be able to compare the PBCH in the first SSB occasion to the PBCH in the second SSB occasion, the UE 115 may re-encode the first PBCH payload to match the second PBCH payload (e.g., the changed PBCH payload). Accordingly, the UE 115 may compare the two PBCH payloads (e.g., identical payloads, similar payloads) to track one or more conditions of the channel between the UE 115 and the transmitting device (e.g., a base station 105).

A PBCH payload may include static bits, semi-static bits, dynamic bits, spare bits, reserved bits, or a combination thereof, as described in more detail with reference to FIG. 4. If static or semi-static bits change, the UE 115 may receive an indication of the change. If dynamic bits change, the dynamic may change in a way that is predictable to the UE 115. If spare bits or reserved bits change, however, the UE 115 may not be configured with a procedure for detecting or determining the change. Such uncertainty about the behavior of spare or reserved bits in the PBCH may result impact reliability of a tracking procedure.

To improve tracking procedures using PBCH payloads, procedures (e.g., rules, constraints) may be configured to govern the change of spare or reserved bits in a PBCH payload when a PBCH is used for tracking purposes, for example. In one example, the spare and/or reserved bits may be constrained to change statically and/or semi-statically. Accordingly, when the spare and/or reserved bits change, the UE 115 may receive signaling indicating such change and the UE 115 may account for such change in the tracking procedure (e.g., re-encode a previously received PBCH payload to match to the change). In another example, the spare and/or reserved bits may be constrained to change at periodic boundaries (e.g., change periodically). As such, the UE 115 may decode each SSB transmission that is received at the periodic boundary and the UE 115 may use the new decoded SSB transmission for the tracking procedure up to the next periodic boundary. In another example, changes in the spare and/or reserved bits may be constrained to be deterministic such that the UE 115 may be able to detect changes to the spare and/or reserved bits and perform the tracking procedure accordingly.

Accordingly, to use the PBCH payload for tracking purposes, UE 115-a may receive and decode a first PBCH payload 210-a in a first SSB occasion. Then, using a configured constraint that limits how the spare and/or reserved bits may change from PBCH to PBCH, UE 115-a may predict or determine a second PBCH payload 210-b based on the first PBCH payload 210-a. UE 115-a may then re-encode the first PBCH payload 210-a into a payload that may be compared with an actually-received second PBCH payload 210-b. UE 115-a may use the comparison of the payloads to perform a tracking procedure 215, such as FTL, TTL, PETL, PDP, Doppler spread estimation, delay spread estimation, etc.

Figure 3:
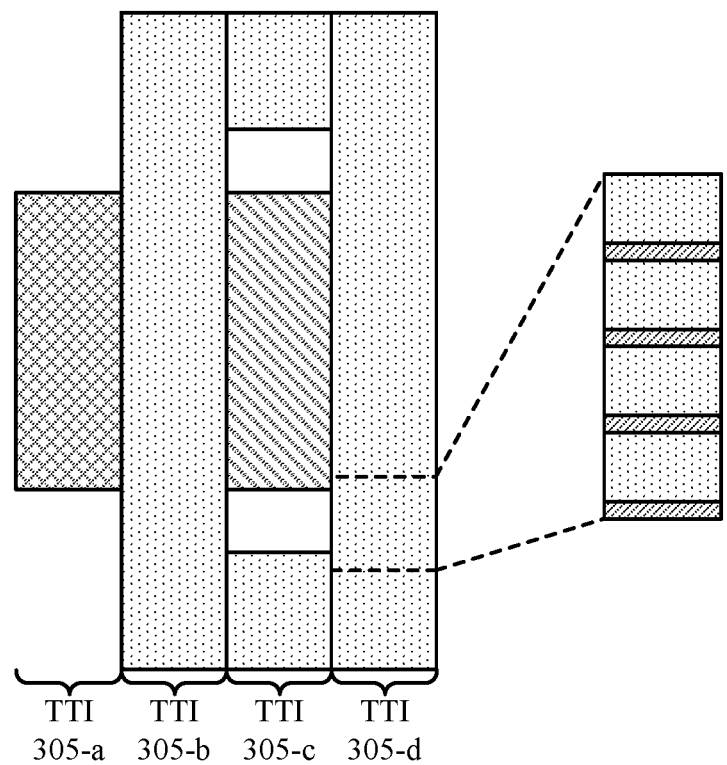
FIG. 3 illustrates an example of a synchronization signal block (SSB) occasion that supports techniques for performing tracking using a PBCH in accordance with aspects of the present disclosure.
Figure 3:
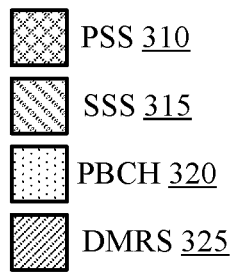

FIG. 3 illustrates an example of an SSB occasion 300 that supports techniques for performing tracking using a PBCH in accordance with aspects of the present disclosure. The SSB occasion 300 may include a primary synchronization signal (PSS) 310, an SSS 315, a PBCH 320 and DMRS occasions 325. An SSB occasion 300 may be used by a base station and a UE, which may be examples of a base station 105 and a UE 115 as described with reference to FIGS. 1 and 2. In some cases, a UE may receive one or more signals, from a base station, during multiple SSB occasions 300, and the UE perform one or more tracking procedures based on the one or more signals received across the multiple SSB occasions 300. Additionally or alternatively, other wireless devices, such as a base station, may implement a same or similar procedure to perform tracking.

A SSB may include four TTIs (e.g., OFDM symbols), where one of the four TTIs 305 may include a PSS 310 (e.g., TTI 305-*a*), one of the four TTIs 305 may include an SSS 315 (e.g., TTI 305-*b*), and two of the four TTIs 305 may include a PBCH 320 (e.g., TTIs 305-*b*, and 305-*d*). PBCH 320 may also be included in TTI 305-*c*. For example, an SSB may span four OFDM symbols in the time domain and a number of subcarriers (e.g., 240 subcarriers) in the frequency domain. A PSS 310 may be transmitted in the first OFDM symbol of the SSB (e.g., TTI 305-*a*) and may occupy a number of subcarriers (e.g., 127 subcarriers) in the frequency domain. The remaining subcarriers (e.g., 240-127) may remain empty. An SSS 315 may be transmitted in the third OFDM symbol of the SSB (e.g., TTI 305-*c*) and may occupy the same set of subcarriers as the PSS. The third OFDM symbol may include a number of empty subcarriers (e.g., eight and nine empty subcarriers) on each side of the SSS 315. A PBCH 320 may be transmitted in the second and fourth OFDM symbols of the SSB (e.g., TTIs 305-*b* and 305-*d*, respectively). In addition, a PBCH transmission may also use a number of subcarriers (e.g., 48 subcarriers) on each side of the SSS in the third OFDM symbol. A PBCH 320 may include a number of DMRSs 325. The number of resource elements used for to transmit a PBCH per SSB may equal 576, in one example (e.g., including resource elements for the PBCH along with resource elements for the demodulation reference signals (DMRS) needed for coherent demodulation of the PBCH).

As described herein, a UE may perform SSB tracking in which the UE may receive DMRSs 325 and/or SSSs 315 of subsequent SSBs to improve the performance of the UE. DMRS 325 and SSS 315 tones may be constant from one SSB occasion to another, and as such, the UE may compare the received DMRS 325 and/or SSS 315 tones of a first SSB occasion 300 to those of a second SSB occasion 300 to determine whether to update time resources, frequency resource, etc. However, the performance of the UE may decrease with decreasing signal quality (e.g., at low SNRs), such as due to low processing gain.

To improve performance, such as at low signal qualities, a UE may be configured to use PBCH payloads for tracking (e.g., PBCH payload-based tracking, PBCH payload for tracking (PPFT). Using a PBCH payload for tracking in addition to SSS 315 and/or DMRS 325 may increase the performance of one or more tracking procedures. For example, in some cases, PBCH payload-based tracking which offer a 6 dB performance boost for FTL and about 7 dB performance boost for TTL, and PDP tracking procedures. The additional performance boost may be based on the increase in the number of tones the UE may use for tracking because the UE may use PBCH data tones, in addition to SSS 315 and DMRS 325 tones.

A PBCH payload may change from SSB occasion 300 to SSB occasion 300. For example, a PBCH payload may include static, semi-static, dynamic, spare, or reserved bits, or a combination thereof, as described in more detail with reference to FIG. 4. If static or semi-static bits change, a UE may receive an indication of the change. If dynamic bits change, the dynamic bits may change in a way that is predictable to the UE. However, in some cases, spare bits or reserved bits change may change unpredictably.

As such, to use the PBCH payload for tracking purposes, the PBCH payload may be configured to change in a way that is predictable to the UE (e.g., in accordance with a rule), or the PBCH may change in a way that the UE may receive an indication of the change. In some cases, the spare and/or reserved bits may be constrained to a rule all the time, or a subset of time. For example, the spare and/or reserved bits may be constrained to the rule at low signal qualities. As such, the UE 115 may use the constrained spare and/or reserved bits at low signal qualities (e.g., signal qualities below a threshold) and may not use un-constrained spare and/or reserved bits at high signal qualities (e.g., signal qualities above a threshold).

FIG. 4 illustrates an example of a PBCH payload assignment 400 that supports techniques for performing tracking using a PBCH in accordance with aspects of the present disclosure. The PBCH payload bit assignment 400 may map bits of the PBCH payload to different configurations, such as semi-static, dynamic, and spare or reserved. A PBCH payload bit assignment 400 may be configured statically, semi-statically, or dynamically and may be known to a base station and a UE, which may be examples of a base station 105 and a UE 115 as described with reference to FIGS. 1 through 3. In some cases, a UE may use one or more bits of a PBCH payload to perform one or more tracking procedures. Additionally or alternatively, other wireless devices, such as a base station, may implement a same or similar procedure to perform tracking.

In some cases, a PBCH payload may include a number of bits (e.g., 32 bits) and each of the bits may be categorized into one of a static bit, semi-static bit, a dynamic bit, a spare bit, or reserved bit. For example, in accordance with PBCH payload bit assignment 400, bits 0, 7 through 22 may be semi-static (or static) bits, bits 1 through 6, 24 through 28 may be dynamic bits, and bit 23 may be a spare or reserve bit. In some cases, the assignment of one or more bits may change based on frequency range. For example, the assignment of bits 29 through 31 may change based on whether the PBCH payload is transmitted in a first frequency range (e.g., mmW) or a second frequency range (e.g., Sub-6). If in the first frequency range, bits 29 through 31 may be dynamic bits. If in the second frequency range, bit 29 may be semi-static and bits 30 and 31 may be spare and/or reserved bits.

Semi-static and static bits may not change frequently, but when they do, a base station may indicate the change to a receiving device (e.g., a UE) so that the receiving device may account for the change. For example, the base station may indicate a change of one or more semi-static and/or static bits in a message (e.g., a short message) included in paging radio network temporary identifier (RNTI). Dynamic bits may change relatively frequently, however, dynamic bits may change based on parameters known to the receiving device, such as SFN, SSBID, HalfFrameNumber, etc. For example, a UE in a camped mode may identify such parameters and determine the dynamic bits based on the identified parameters. As the parameters change, the UE may identify the change in the dynamic bits.

In some cases, spare and/or reserved bits may be configured to change in accordance with a rule (e.g., constraint). In one example, the spare and/or reserved bits may be constrained to change statically and/or semi-statically. Accordingly, when the spare and/or reserved bits change, the UE 115 may receive signaling indicating such change and the UE 115 may account for such change in the tracking procedure (e.g., re-encode a previously received PBCH payload to match to the change). The UE may receive an indication of the one or more changed bits in radio resource control (RRC) signaling, MAC-CE signaling, downlink control information (DCI) signaling, or a combination thereof. The indication may indicate one or more SSB occasions for which the change is relevant. The indication may be a mapping (e.g., a bitmap) to indicate the one or more bits that are changing, the one or more bits that are remaining the same, or a combination thereof. Accordingly, unless the UE receives a signal indicating a change, the UE may assume that the payload is unchanged from one SSB occasion to the next.

In another example, the spare and/or reserved bits may be constrained to change at periodic boundaries (e.g., change periodically). As such, the UE 115 may decode each SSB transmission that is received at the periodic boundary and the UE 115 may use the new decoded SSB transmission for the tracking procedure up to the next periodic boundary. Accordingly, the UE may assume that the spare and reserved bits in the payload from SSB occasion to SSB occasion may be unchanged in between periodic boundaries. For example, a UE may receive a first payload at a periodic boundary and as such, the UE may decode the payload to identify each bit in the payload. The UE may then identify changes made to the non-spare, non-reserved bits of the payload (e.g., dynamic, semi-static, static bits) in a next SSB occasion (e.g., second SSB occasion) and re-encode the first payload to resemble the second payload. The UE may then receive the second payload and compare the re-encoded first payload to the second payload. The UE may continue identifying changes to non-spare, and non-reserved bits, continue re-encoding the payload, and comparing the re-encoded payload to the current payload. The UE may not decode a payload until the next periodic boundary. In some cases, the spare and reserved bits may be configured to change at a system information block (SIB) modification boundary, or some other predetermined boundary.

In another example, changes in the spare and/or reserved bits may be constrained to be deterministic such that the UE 115 may be able to detect changes to the spare and/or reserved bits and perform the tracking procedure accordingly. The spare and/or reserved bits may be configured to be deterministic based on one or more parameters, such SFN, SSBID, HalfFrameNumber, etc. For example, a UE may identify such parameters and determine the bit values in the spare and/or reserved bit locations of the payload based on the identified parameters. As the parameters change, the UE may identify the change in the spare and reserved bits. Accordingly, the UE may decode a first payload received in a first SSB location, and identify any changes to payload from the first SSB occasion to a second SSB occasion, including changes to spare and reserved bits (e.g., based on changes to the one or more parameters). The UE my then re-encode the first payload based on the identified changes to match the second payload to compare the re-encoded payload to the second payload for tracking purposes.

A UE may be configured to perform PPFT to predict and reencode a PBCH payload at desired SSB occasions and use the re-encoded PBCH payload for enhancing tracking (e.g., loop tracking). In some cases, a UE may determine to perform PPFT (e.g., autonomously), such as if the performance of the UE decreases (e.g., decreases below a threshold), or if the signal quality received by the UE decreases (e.g., decreases below a threshold), or a combination thereof. Accordingly, if the performance of the UE and/or the signal quality at the UE is above a threshold, the UE may determine not to perform PPFT. Rather, the UE may use SSS and DMRS tones to perform tracking procedures. In some cases, the UE may receive a message, such as from a serving base station, that indicates the UE is to perform PPFT. The UE may receive such an indication aperiodically, semi-statically, or dynamically (e.g., via RRC, MAC-CE, of DCI, respectively).

To perform PPFT, a UE may receive and decode a first PBCH in a first SSB occasion. The UE may identify a change to one or more bits (e.g., semi-static bits, static bits, dynamic bits, spare bits, reserved bits) of the PBCH that will be received in a second SSB occasion. To be able to compare the PBCH in the first SSB occasion to the PBCH in the second SSB occasion, the UE may re-encode the first PBCH payload to match the second PBCH payload (e.g., the changed PBCH payload). Accordingly, the UE may compare the two PBCH payloads (e.g., identical payloads, similar payloads) to track one or more conditions of the channel between the UE and the transmitting device (e.g., a base station).

Figure 5:
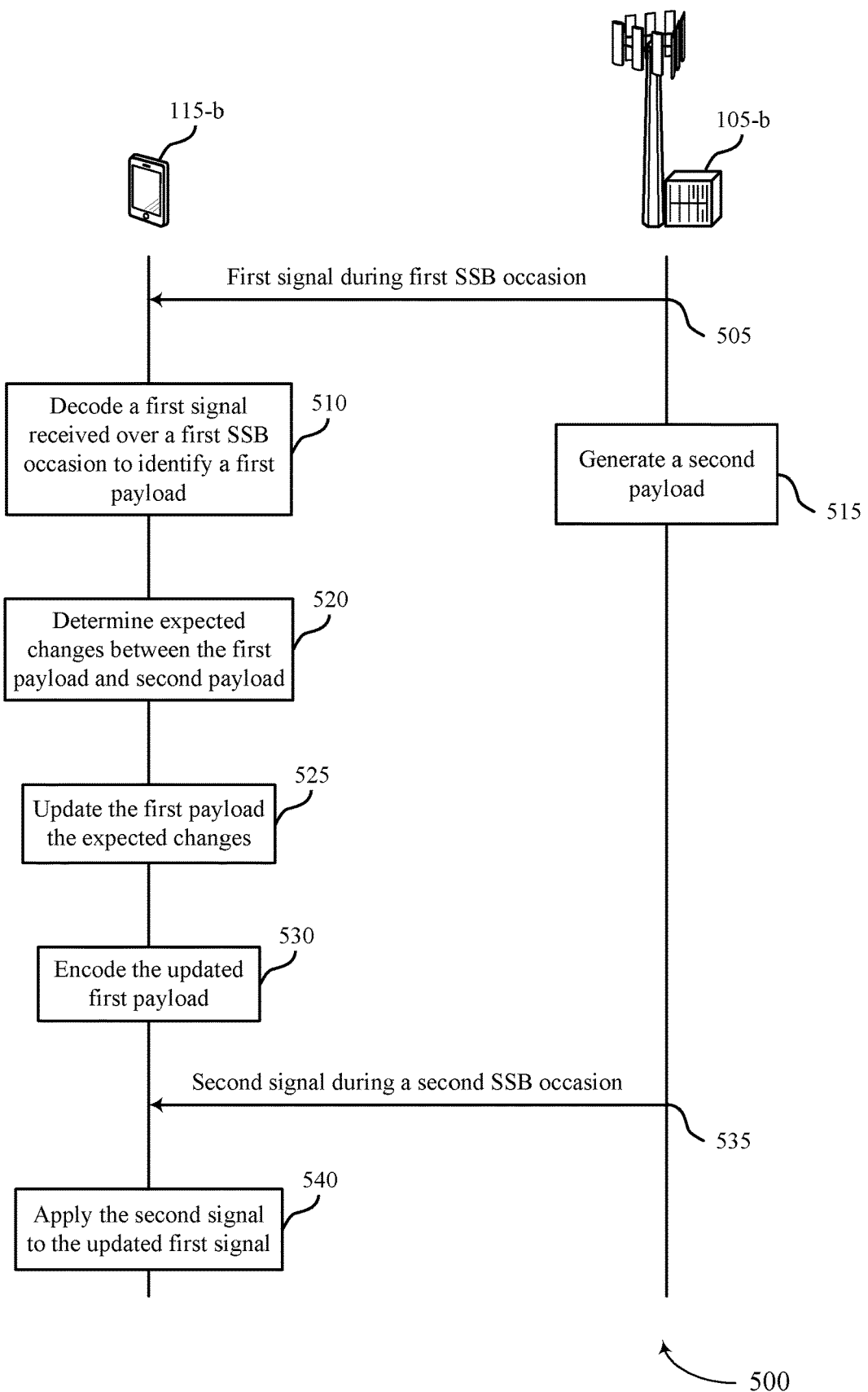
FIG. 5 illustrates an example of a process flow that supports techniques for performing tracking using a PBCH in accordance with aspects of the present disclosure.

FIG. 5 illustrates an example of a process flow 500 that supports techniques for performing tracking using a PBCH in accordance with aspects of the present disclosure. The process flow 500 may illustrate an example tracking procedure of a broadcast channel. For example, UE 115-b may perform a tracking procedure for broadcast channels transmission from base station 105-b. Base station 105-b and UE 115-b, may be examples of the corresponding wireless devices described with reference to FIGS. 1 through 4. In some cases, instead of UE 115-b implementing the tracking procedure, a different type of wireless device (e.g., a base station 105) may perform a same or similar procedure. Alternative examples of the following may be implemented, where some steps are performed in a different order than described or are not performed at all. In some cases, steps may include additional features not mentioned below, or further steps may be added.

At 505, base station 105-b may transmit a first signal over a broadcast channel during a first synchronization signal block occasion. The first signal may include a first payload having one or more spare bits or reserved bits having first values.

At 510, UE 115-b may decode a first signal received over a broadcast channel during a first SSB occasion to identify a first payload. In some cases, decoding the first signal may include UE 115-b determining that the first SSB occasion occurs at an initial boundary of the periodic time interval, and decoding the first signal received during the first SSB occasion based at least in part on the first SSB occasion occurring at the initial boundary of the periodic time interval in accordance with the rule.

At 515, base station 105-b may generate a second payload for inclusion in a second signal to be transmitted over the broadcast channel during a second SSB occasion subsequent to the first SSB occasion. The second payload may include second values for the one or more spare bits or reserved bits. A change from the first values to the second values may be in accordance with a rule. The rule may require that changes with respect to spare bits or reserved bits in broadcast channels of subsequent SSB occasions be predictable. In some cases, the second values for the one or more spare bits or reserved bits are the first values for the one or more spare bits or reserved bits, as a result of the first SSB occasion and the second SSB occasion being both within a same periodic time interval.

In some cases, generating the second payload may include base station 105-b determining the second values for the one or more spare bits or reserved bits in accordance with the rule, wherein the rule may be that changes to values of the one or more spare bits or reserved bits between subsequent synchronization system block occasions are to be predictable. In some cases, generating the second payload may include base station 105-b determining the second values for the one or more spare bits or reserved bits in accordance with the rule, wherein the rule may that changes to values of the one or more spare bits or reserved bits only occur at boundaries of periodic time intervals.

In some implementations, base station 105-*b* may determine the second values for the one or more spare bits or reserved bits in accordance with the rule, wherein the rule may be that changes to values of the one or more spare bits or reserved bits are to be announced via one or more messages transmitted by base station 105-*b*. Base station 105-*b* may transmit the one or more messages announcing the changes to the values of the one or more spare bits or reserved bits.

In some cases, UE 115-*b* may receive an indication of the rule via radio resource control signaling, medium access control element signaling, downlink control information signaling, or a combination thereof, wherein the rule may pertain to determination of the one or more expected changes with respect to spare bits or reserved bits in the first payload. In some implementations, UE 115-*b* may identify a rule that pertains to determination of the one or more expected changes with respect to spare bits or reserved bits in the first payload, wherein UE 115-*b* may be preconfigured with the rule.

At 520, UE 115-*b* may determine one or more expected changes between the first payload and a second payload of a second signal expected to be received over the broadcast channel during a second SSB occasion. In some cases, determining the one or more expected changes may include UE 15-*b* determining the one or more expected changes with respect to spare bits or reserved bits in the first payload in accordance with a rule.

In some implementations, determining the one or more expected changes with respect to spare bits or reserved bits in the first payload may include receiving a message, in accordance with the rule, indicating new values of the spare bits or reserved bits, where the new values may be included in the second payload and representative of the one or more expected changes with respect to spare bits or reserved bits.

In some cases, determining the one or more expected changes with respect to spare bits or reserved bits in the first payload may include predicting, in accordance with the rule, new values of the spare bits or reserved bits, wherein the new values may be included in the second payload and representative of the one or more expected changes with respect to spare bits or reserved bits.

In some implementations, determining the one or more expected changes further comprises, determining that values of spare bits or reserved bits do not change from the first payload to the second payload as a result of the first payload and the second payload being within a same periodic time interval and in accordance with a rule. The values of spare bits or reserved bits in broadcast channels of SSBs may only be allowed to change at a beginning of a periodic time interval.

At 525, UE 115-*b* may update the first payload with the one or more expected changes to determine an updated first payload.

At 530, UE 115-*b* may encode the updated first payload as an updated first signal.

At 535, UE 115-*b* may receive the second signal over the broadcast channel during the second SSB occasion.

In some cases, UE 115-*b* may determine that the second SSB occasion occurs after the first SSB occasion but within the periodic time interval. Accordingly, UE 115-*b* may refrain from decoding the second signal received during the second SSB occasion based at least in part on the second SSB occasion occurring after the first SSB occasion but within the periodic time interval in accordance with the rule.

At 540, UE 115-*b* may apply the second signal and the updated first signal to a tracking procedure for UE 115-*b*.

The tracking procedure may be a frequency tracking loop procedure, a time tracking loop procedure, a projected energy tracking procedure, a power delay profile estimation procedure, a doppler spread estimation procedure, a delay spread estimation procedure, or a combination thereof.

Figure 6:
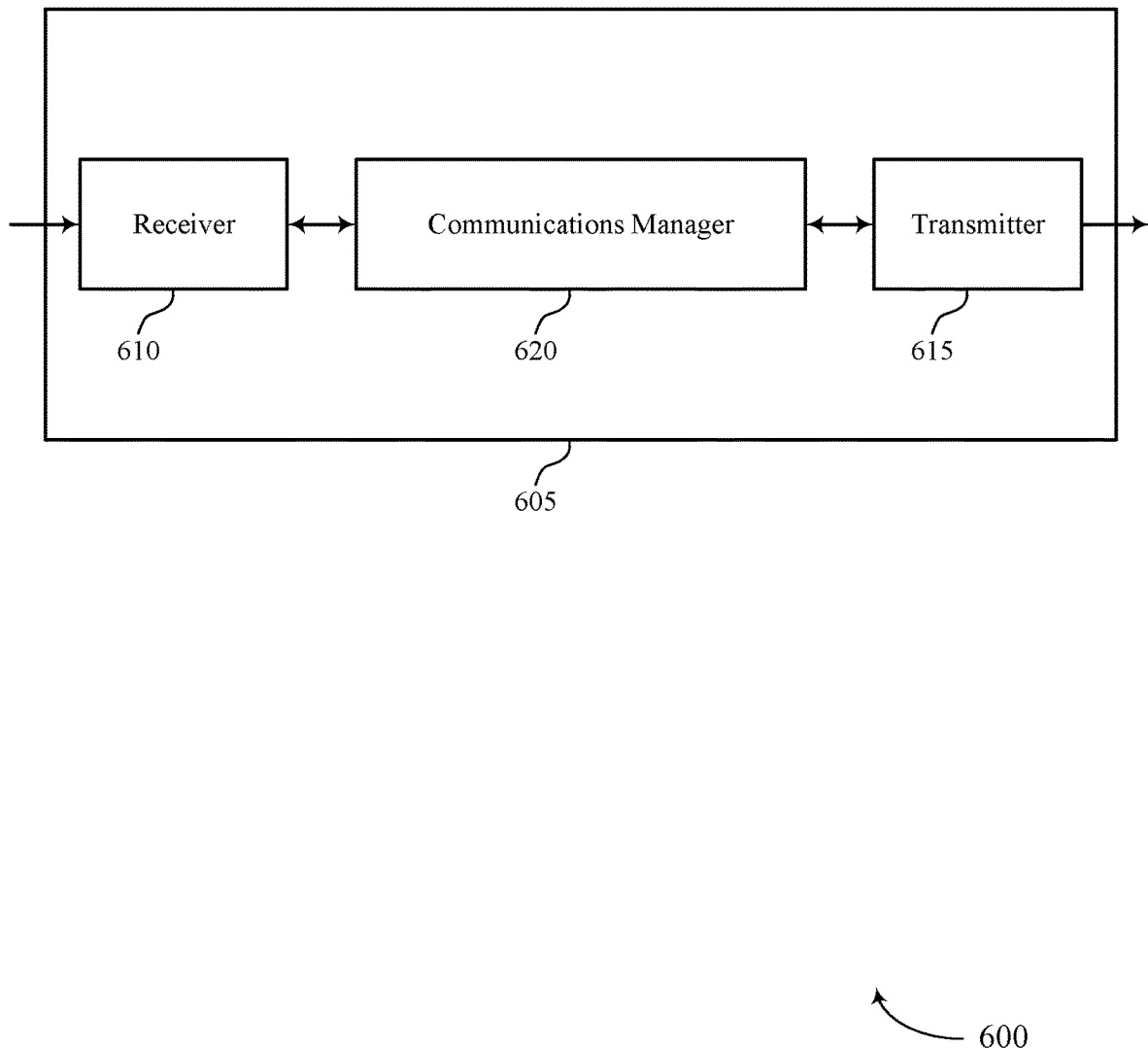
FIGS. 6 and 7 show block diagrams of devices that support techniques for performing tracking using a PBCH in accordance with aspects of the present disclosure.

FIG. 6 shows a block diagram 600 of a device 605 that supports techniques for performing tracking using a PBCH in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing tracking using a PBCH). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing tracking using a PBCH). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for performing tracking using a PBCH as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for decoding a first signal received over a broadcast channel during a first SSB occasion to identify a first payload. The communications manager 620 may be configured as or otherwise support a means for determining one or more expected changes between the first payload and a second payload of a second signal expected to be received over the broadcast channel during a second SSB occasion. The communications manager 620 may be configured as or otherwise support a means for updating the first payload with the one or more expected changes to determine an updated first payload. The communications manager 620 may be configured as or otherwise support a means for encoding the updated first payload as an updated first signal. The communications manager 620 may be configured as or otherwise support a means for receiving the second signal over the broadcast channel during the second SSB occasion. The communications manager 620 may be configured as or otherwise support a means for applying the second signal and the updated first signal to a tracking procedure for the UE.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources.

Figure 7:
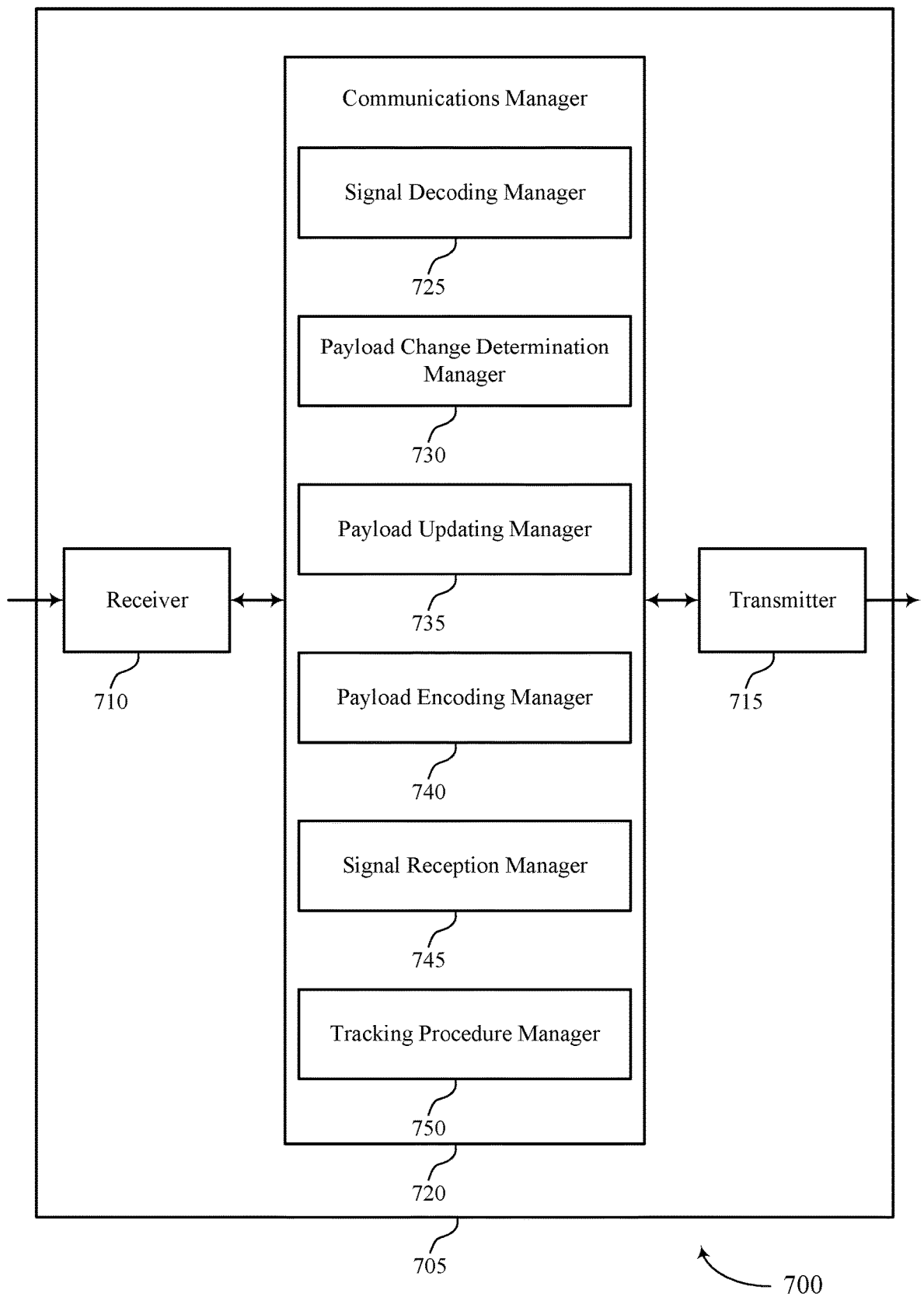

FIG. 7 shows a block diagram 700 of a device 705 that supports techniques for performing tracking using a PBCH in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for performing tracking using a PBCH). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for performing tracking using a PBCH). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for performing tracking using a PBCH as described herein. For example, the communications manager 720 may include a signal decoding manager 725, a payload change determination manager 730, a payload updating manager 735, a payload encoding manager 740, a signal reception manager 745, a tracking procedure manager 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The signal decoding manager 725 may be configured as or otherwise support a means for decoding a first signal received over a broadcast channel during a first SSB occasion to identify a first payload. The payload change determination manager 730 may be configured as or otherwise support a means for determining one or more expected changes between the first payload and a second payload of a second signal expected to be received over the broadcast channel during a second SSB occasion. The payload updating manager 735 may be configured as or otherwise support a means for updating the first payload with the one or more expected changes to determine an updated first payload. The payload encoding manager 740 may be configured as or otherwise support a means for encoding the updated first payload as an updated first signal. The signal reception manager 745 may be configured as or otherwise support a means for receiving the second signal over the broadcast channel during the second SSB occasion. The tracking procedure manager 750 may be configured as or otherwise support a means for applying the second signal and the updated first signal to a tracking procedure for the UE.

Figure 8:
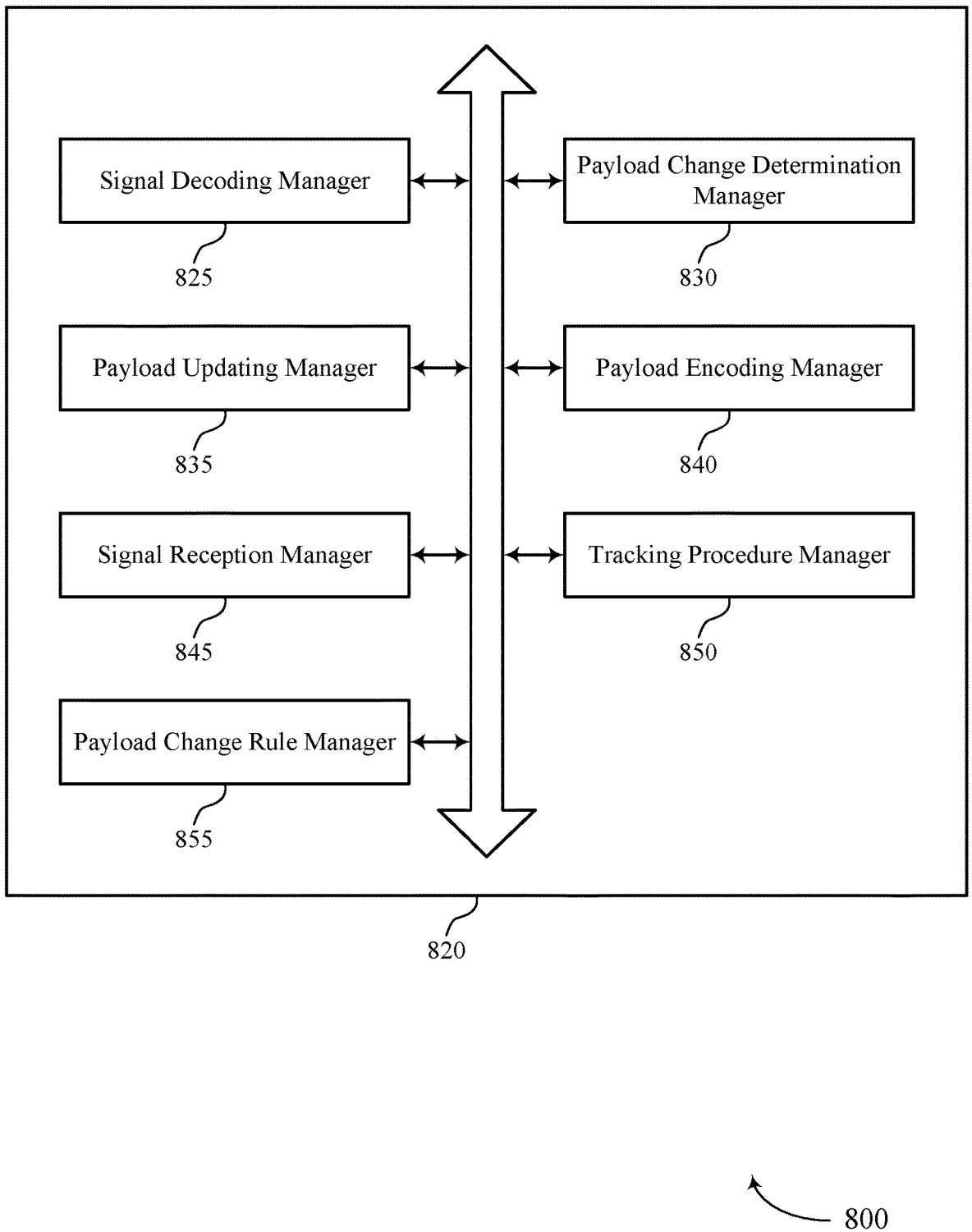
FIG. 8 shows a block diagram of a communications manager that supports techniques for performing tracking using a PBCH in accordance with aspects of the present disclosure.

FIG. 8 shows a block diagram 800 of a communications manager 820 that supports techniques for performing tracking using a PBCH in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for performing tracking using a PBCH as described herein. For example, the communications manager 820 may include a signal decoding manager 825, a payload change determination manager 830, a payload updating manager 835, a payload encoding manager 840, a signal reception manager 845, a tracking procedure manager 850, a payload change rule manager 855, or any combination thereof. Each of these components may communicate, directly or indirectly, with one another (e.g., via one or more buses).

The communications manager 820 may support wireless communications at a UE in accordance with examples as disclosed herein. The signal decoding manager 825 may be configured as or otherwise support a means for decoding a first signal received over a broadcast channel during a first SSB occasion to identify a first payload. The payload change determination manager 830 may be configured as or otherwise support a means for determining one or more expected changes between the first payload and a second payload of a second signal expected to be received over the broadcast channel during a second SSB occasion. The payload updating manager 835 may be configured as or otherwise support a means for updating the first payload with the one or more expected changes to determine an updated first payload. The payload encoding manager 840 may be configured as or otherwise support a means for encoding the updated first payload as an updated first signal. The signal reception manager 845 may be configured as or otherwise support a means for receiving the second signal over the broadcast channel during the second SSB occasion. The tracking procedure manager 850 may be configured as or otherwise support a means for applying the second signal and the updated first signal to a tracking procedure for the UE.

In some examples, to support determining the one or more expected changes, the payload change determination manager 830 may be configured as or otherwise support a means for determining the one or more expected changes with respect to spare bits or reserved bits in the first payload in accordance with a rule.

In some examples, to support determining the one or more expected changes with respect to spare bits or reserved bits in the first payload, the payload change determination manager 830 may be configured as or otherwise support a means for receiving a message, in accordance with the rule, indicating new values of the spare bits or reserved bits, the new values to be included in the second payload and representative of the one or more expected changes with respect to spare bits or reserved bits.

In some examples, to support determining the one or more expected changes with respect to spare bits or reserved bits in the first payload, the payload change determination manager 830 may be configured as or otherwise support a means for predicting, in accordance with the rule, new values of the spare bits or reserved bits, the new values to be included in the second payload and representative of the one or more expected changes with respect to spare bits or reserved bits.

In some examples, the rule requires that changes with respect to spare bits or reserved bits in broadcast channels of subsequent SSB occasions be predictable.

In some examples, to support determining the one or more expected changes, the payload change determination manager 830 may be configured as or otherwise support a means for determining that values of spare bits or reserved bits do not change from the first payload to the second payload as a result of the first payload and the second payload being within a same periodic time interval and in accordance with a rule where the values of spare bits or reserved bits in broadcast channels of SSBs are only allowed to change at a beginning of a periodic time interval.

In some examples, to support decoding the first signal, the payload change determination manager 830 may be configured as or otherwise support a means for determining that the first SSB occasion occurs at an initial boundary of the periodic time interval. In some examples, to support decoding the first signal, the signal decoding manager 825 may be configured as or otherwise support a means for decoding the first signal received during the first SSB occasion based on the first SSB occasion occurring at the initial boundary of the periodic time interval in accordance with the rule.

In some examples, the payload change determination manager 830 may be configured as or otherwise support a means for determining that the second SSB occasion occurs after the first SSB occasion but within the periodic time interval. In some examples, the signal decoding manager 825 may be configured as or otherwise support a means for refraining from decoding the second signal received during the second SSB occasion based on the second SSB occasion occurring after the first SSB occasion but within the periodic time interval in accordance with the rule.

In some examples, the payload change rule manager 855 may be configured as or otherwise support a means for receiving an indication of a rule via radio resource control signaling, medium access control element signaling, downlink control information signaling, or a combination thereof, where the rule pertains to determination of the one or more expected changes with respect to spare bits or reserved bits in the first payload.

In some examples, the payload change determination manager 830 may be configured as or otherwise support a means for identifying a rule that pertains to determination of the one or more expected changes with respect to spare bits or reserved bits in the first payload, where the UE is preconfigured with the rule.

In some examples, the tracking procedure is a frequency tracking loop procedure, a time tracking loop procedure, a projected energy tracking procedure, a power delay profile estimation procedure, a doppler spread estimation procedure, a delay spread estimation procedure, or a combination thereof.

Figure 9:
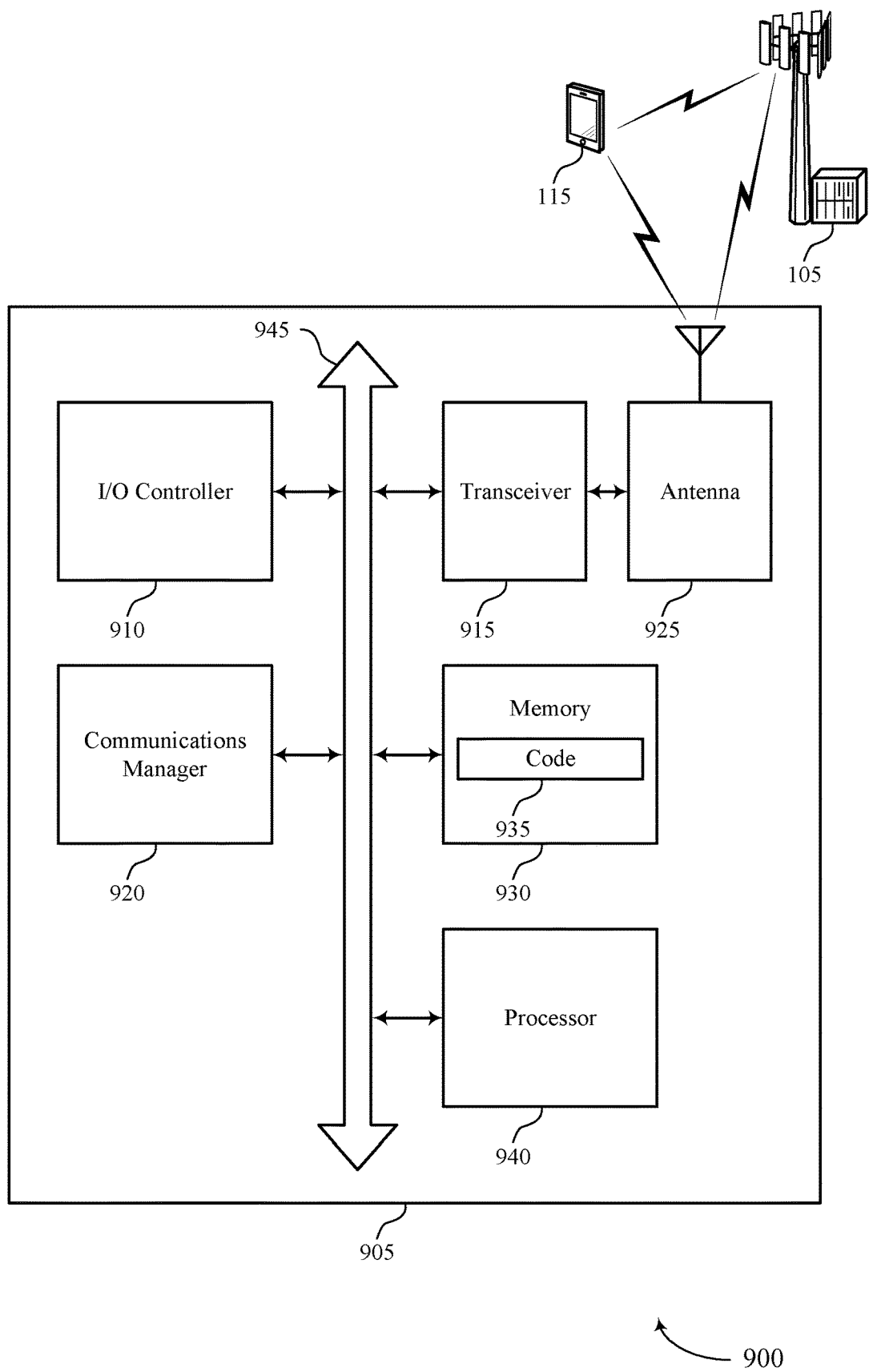
FIG. 9 shows a diagram of a system including a device that supports techniques for performing tracking using a PBCH in accordance with aspects of the present disclosure.

FIG. 9 shows a diagram of a system 900 including a device 905 that supports techniques for performing tracking using a PBCH in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for performing tracking using a PBCH). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for decoding a first signal received over a broadcast channel during a first SSB occasion to identify a first payload. The communications manager 920 may be configured as or otherwise support a means for determining one or more expected changes between the first payload and a second payload of a second signal expected to be received over the broadcast channel during a second SSB occasion. The communications manager 920 may be configured as or otherwise support a means for updating the first payload with the one or more expected changes to determine an updated first payload. The communications manager 920 may be configured as or otherwise support a means for encoding the updated first payload as an updated first signal. The communications manager 920 may be configured as or otherwise support a means for receiving the second signal over the broadcast channel during the second SSB occasion. The communications manager 920 may be configured as or otherwise support a means for applying the second signal and the updated first signal to a tracking procedure for the UE.

By including or configuring the communications manager 920 in accordance with examples as described herein, the device 905 may support techniques for improved communication reliability, more efficient utilization of communication resources, improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for performing tracking using a PBCH as described herein, or the processor 940 and the memory 930 may be otherwise configured to perform or support such operations.

Figure 10:
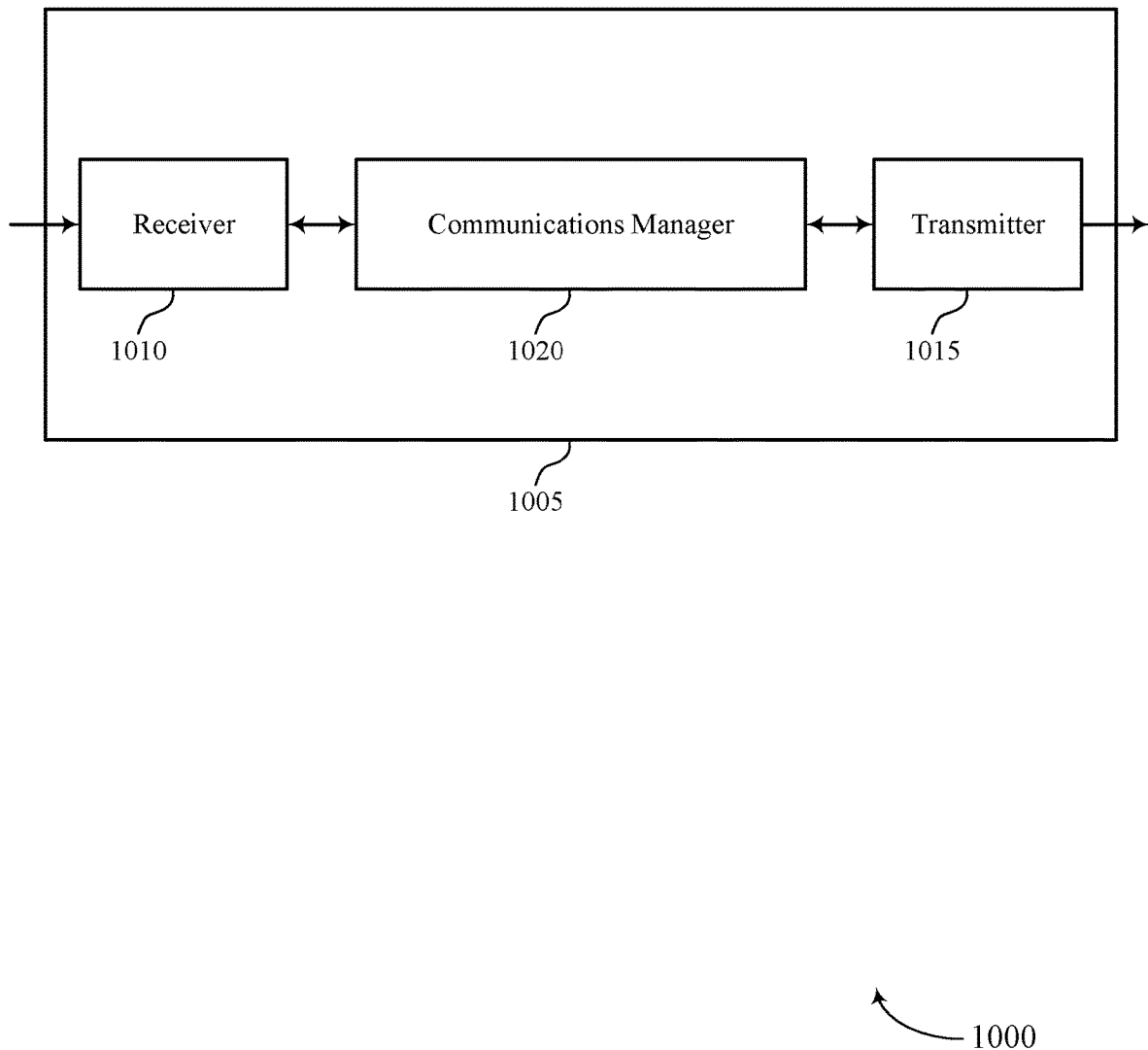
FIGS. 10 and 11 show block diagrams of devices that support techniques for performing tracking using a PBCH in accordance with aspects of the present disclosure.

FIG. 10 shows a block diagram 1000 of a device 1005 that supports techniques for performing tracking using a PBCH in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for performing tracking using a PBCH). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for performing tracking using a PBCH). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for performing tracking using a PBCH as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting a first signal over a broadcast channel during a first SSB occasion, the first signal including a first payload having one or more spare bits or reserved bits having first values. The communications manager 1020 may be configured as or otherwise support a means for generating a second payload for inclusion in a second signal to be transmitted over the broadcast channel during a second SSB occasion subsequent to the first SSB occasion, where the second payload includes second values for the one or more spare bits or reserved bits, and where a change from the first values to the second values is in accordance with a rule. The communications manager 1020 may be configured as or otherwise support a means for transmitting the second signal over the broadcast channel during the second SSB occasion.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
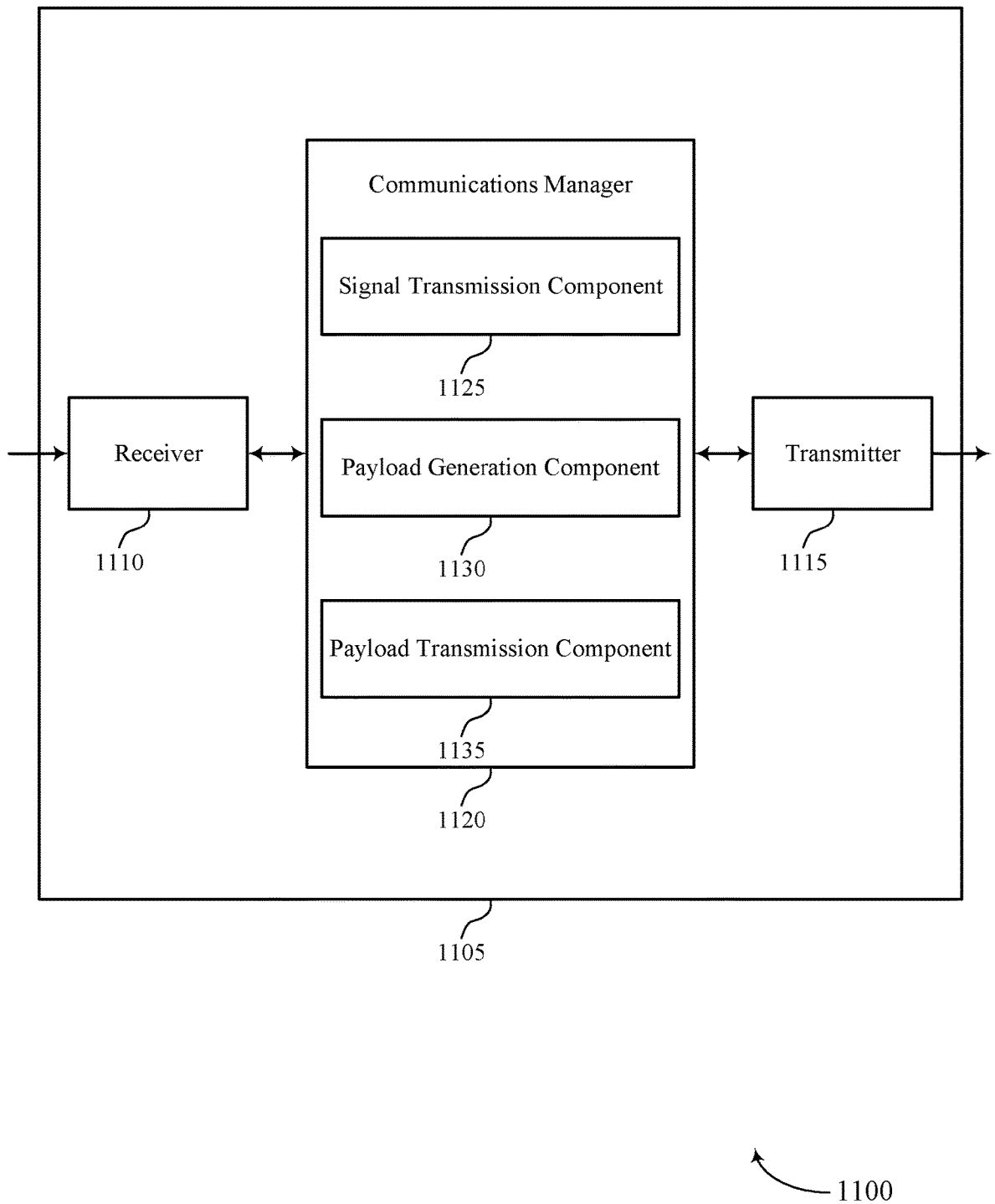

FIG. 11 shows a block diagram 1100 of a device 1105 that supports techniques for performing tracking using a PBCH in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for performing tracking using a PBCH). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for performing tracking using a PBCH). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for performing tracking using a PBCH as described herein. For example, the communications manager 1120 may include a signal transmission component 1125, a payload generation component 1130, a payload transmission component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The signal transmission component 1125 may be configured as or otherwise support a means for transmitting a first signal over a broadcast channel during a first SSB occasion, the first signal including a first payload having one or more spare bits or reserved bits having first values. The payload generation component 1130 may be configured as or otherwise support a means for generating a second payload for inclusion in a second signal to be transmitted over the broadcast channel during a second SSB occasion subsequent to the first SSB occasion, where the second payload includes second values for the one or more spare bits or reserved bits, and where a change from the first values to the second values is in accordance with a rule. The payload transmission component 1135 may be configured as or otherwise support a means for transmitting the second signal over the broadcast channel during the second SSB occasion.

Figure 12:
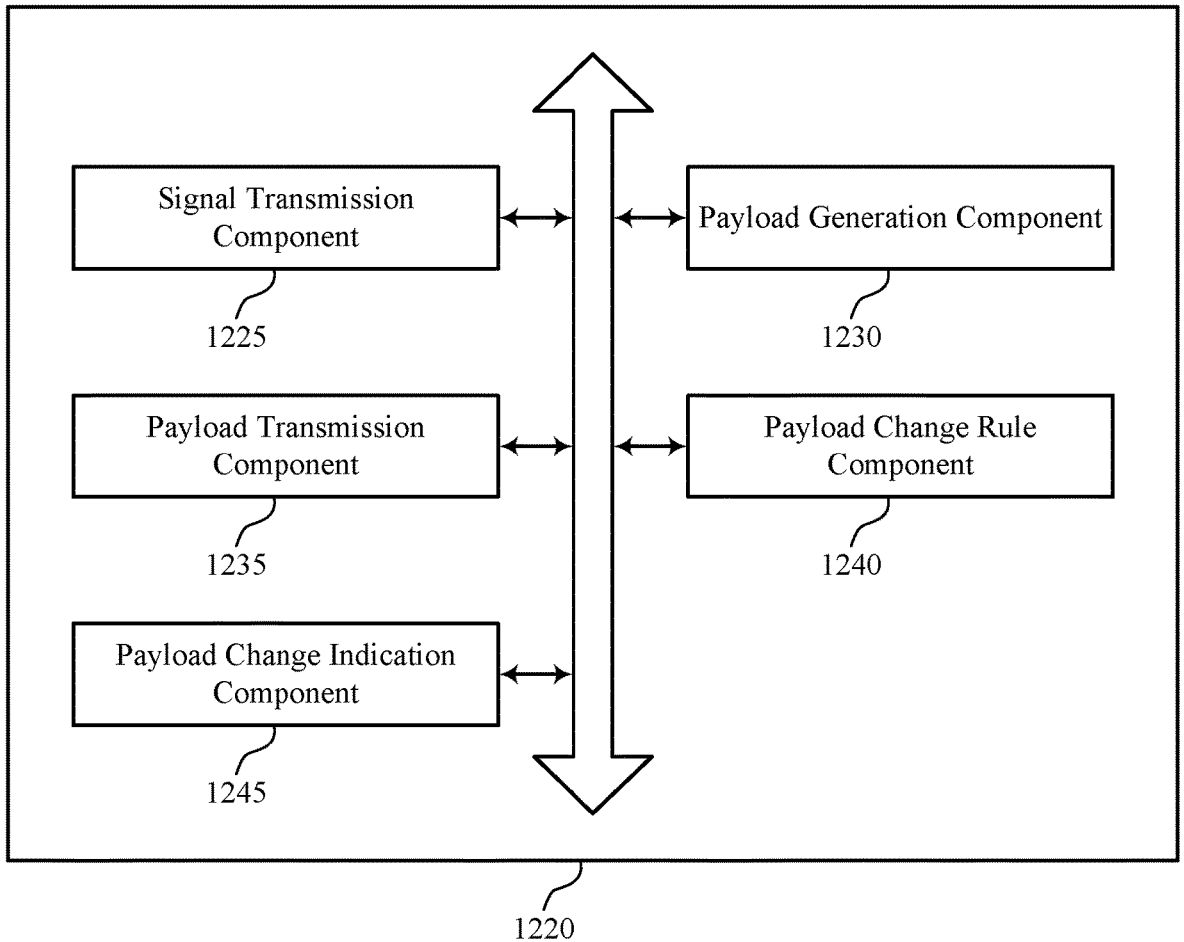
FIG. 12 shows a block diagram of a communications manager that supports techniques for performing tracking using a PBCH in accordance with aspects of the present disclosure.

FIG. 12 shows a block diagram 1200 of a communications manager 1220 that supports techniques for performing tracking using a PBCH in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for performing tracking using a PBCH as described herein. For example, the communications manager 1220 may include a signal transmission component 1225, a payload generation component 1230, a payload transmission component 1235, a payload change rule component 1240, a payload change indication component 1245, or any combination thereof. Each of these components may communicate, directly or indirectly, with one another (e.g., via one or more buses).

The communications manager 1220 may support wireless communications at a base station in accordance with examples as disclosed herein. The signal transmission component 1225 may be configured as or otherwise support a means for transmitting a first signal over a broadcast channel during a first SSB occasion, the first signal including a first payload having one or more spare bits or reserved bits having first values. The payload generation component 1230 may be configured as or otherwise support a means for generating a second payload for inclusion in a second signal to be transmitted over the broadcast channel during a second SSB occasion subsequent to the first SSB occasion, where the second payload includes second values for the one or more spare bits or reserved bits, and where a change from the first values to the second values is in accordance with a rule. The payload transmission component 1235 may be configured as or otherwise support a means for transmitting the second signal over the broadcast channel during the second SSB occasion.

In some examples, to support generating the second payload, the payload generation component 1230 may be configured as or otherwise support a means for determining the second values for the one or more spare bits or reserved bits in accordance with the rule, where the rule is that changes to values of the one or more spare bits or reserved bits are to be announced via one or more messages transmitted by the base station.

In some examples, the payload change indication component 1245 may be configured as or otherwise support a means for transmitting the one or more messages announcing the changes to the values of the one or more spare bits or reserved bits.

In some examples, to support generating the second payload, the payload generation component 1230 may be configured as or otherwise support a means for determining the second values for the one or more spare bits or reserved bits in accordance with the rule, where the rule is that changes to values of the one or more spare bits or reserved bits between subsequent synchronization system block occasions are to be predictable.

In some examples, to support generating the second payload, the payload generation component 1230 may be configured as or otherwise support a means for determining the second values for the one or more spare bits or reserved bits in accordance with the rule, where the rule is that changes to values of the one or more spare bits or reserved bits only occur at boundaries of periodic time intervals.

In some examples, the second values for the one or more spare bits or reserved bits are the first values for the one or more spare bits or reserved bits, as a result of the first SSB occasion and the second SSB occasion being both within a same periodic time interval.

In some examples, the payload change rule component 1240 may be configured as or otherwise support a means for transmitting an indication of the rule via radio resource control signaling, medium access control element signaling, downlink control information signaling, or a combination thereof, where the rule pertains to determination by a UE of changes between the first values for the one or more spare bits or reserved bits and the second values for the one or more spare bits or reserved bits.

Figure 13:
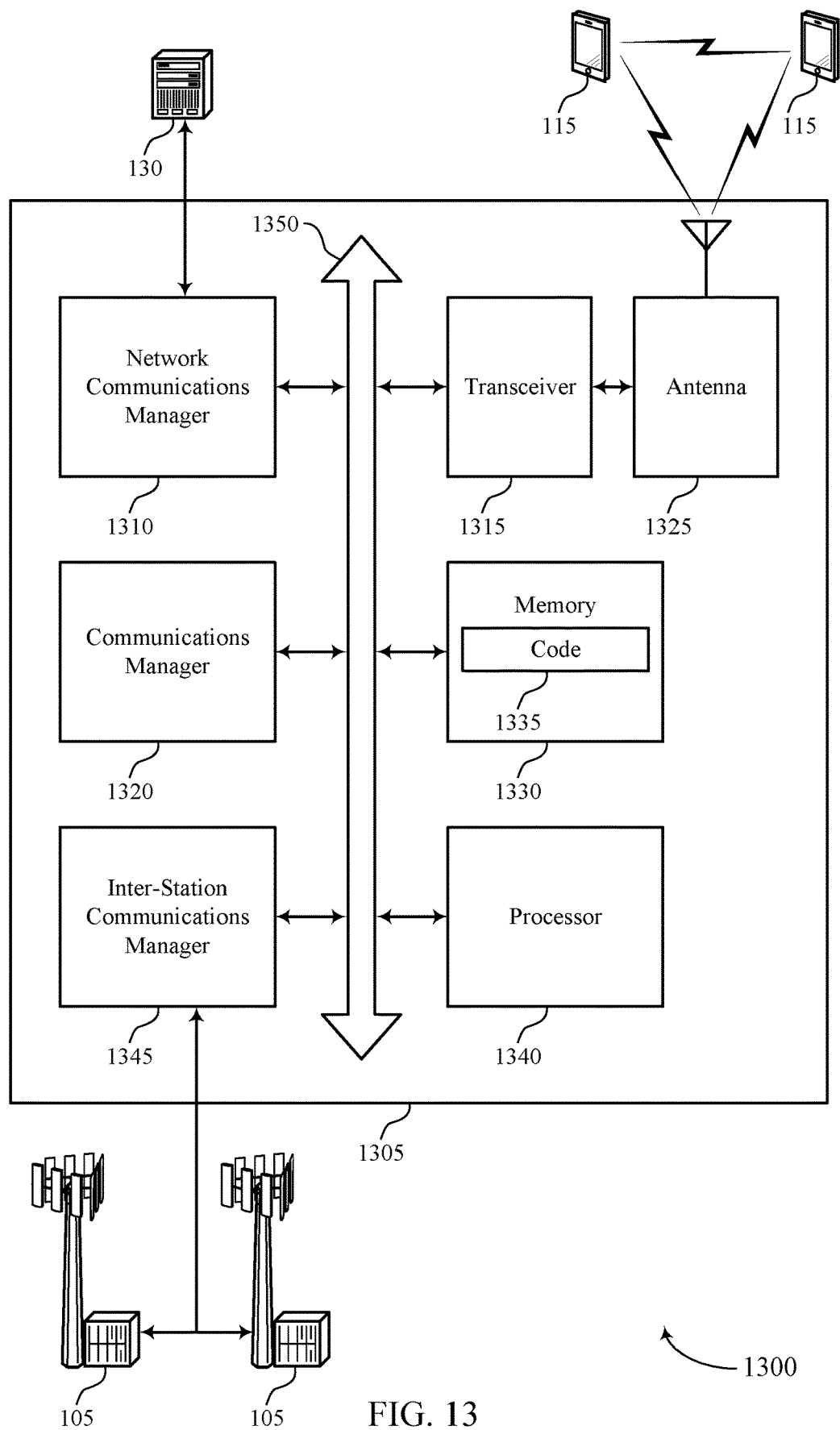
FIG. 13 shows a diagram of a system including a device that supports techniques for performing tracking using a PBCH in accordance with aspects of the present disclosure.

FIG. 13 shows a diagram of a system 1300 including a device 1305 that supports techniques for performing tracking using a PBCH in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for performing tracking using a PBCH). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting a first signal over a broadcast channel during a first SSB occasion, the first signal including a first payload having one or more spare bits or reserved bits having first values. The communications manager 1320 may be configured as or otherwise support a means for generating a second payload for inclusion in a second signal to be transmitted over the broadcast channel during a second SSB occasion subsequent to the first SSB occasion, where the second payload includes second values for the one or more spare bits or reserved bits, and where a change from the first values to the second values is in accordance with a rule. The communications manager 1320 may be configured as or otherwise support a means for transmitting the second signal over the broadcast channel during the second SSB occasion.

By including or configuring the communications manager 1320 in accordance with examples as described herein, the device 1305 may support techniques for improved communication reliability, more efficient utilization of communication resources, improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for performing tracking using a PBCH as described herein, or the processor 1340 and the memory 1330 may be otherwise configured to perform or support such operations.

Figure 14:
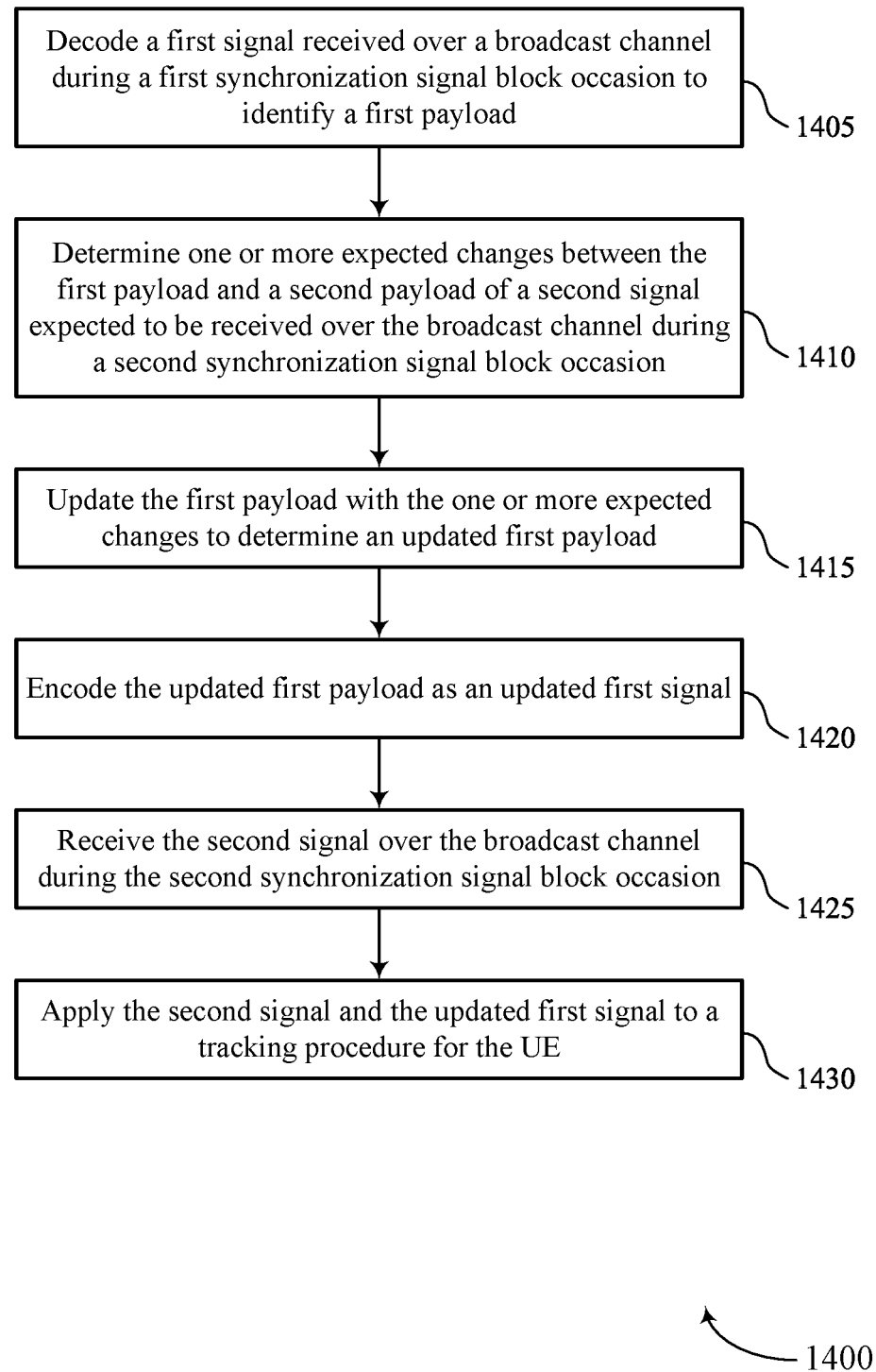
FIGS. 14 through 17 show flowcharts illustrating methods that support techniques for performing tracking using a PBCH in accordance with aspects of the present disclosure.

FIG. 14 shows a flowchart illustrating a method 1400 that supports techniques for performing tracking using a PBCH in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include decoding a first signal received over a broadcast channel during a first SSB occasion to identify a first payload. The operations of 1405 may be performed in accordance with examples as disclosed herein. In some examples, aspects of the operations of 1405 may be performed by a signal decoding manager 825 as described with reference to FIG. 8.

At 1410, the method may include determining one or more expected changes between the first payload and a second payload of a second signal expected to be received over the broadcast channel during a second SSB occasion. The operations of 1410 may be performed in accordance with examples as disclosed herein. In some examples, aspects of the operations of 1410 may be performed by a payload change determination manager 830 as described with reference to FIG. 8.

At 1415, the method may include updating the first payload with the one or more expected changes to determine an updated first payload. The operations of 1415 may be performed in accordance with examples as disclosed herein. In some examples, aspects of the operations of 1415 may be performed by a payload updating manager 835 as described with reference to FIG. 8.

At 1420, the method may include encoding the updated first payload as an updated first signal. The operations of 1420 may be performed in accordance with examples as disclosed herein. In some examples, aspects of the operations of 1420 may be performed by a payload encoding manager 840 as described with reference to FIG. 8.

At 1425, the method may include receiving the second signal over the broadcast channel during the second SSB occasion. The operations of 1425 may be performed in accordance with examples as disclosed herein. In some examples, aspects of the operations of 1425 may be performed by a signal reception manager 845 as described with reference to FIG. 8.

At 1430, the method may include applying the second signal and the updated first signal to a tracking procedure for the UE. The operations of 1430 may be performed in accordance with examples as disclosed herein. In some examples, aspects of the operations of 1430 may be performed by a tracking procedure manager 850 as described with reference to FIG. 8.

Figure 15:
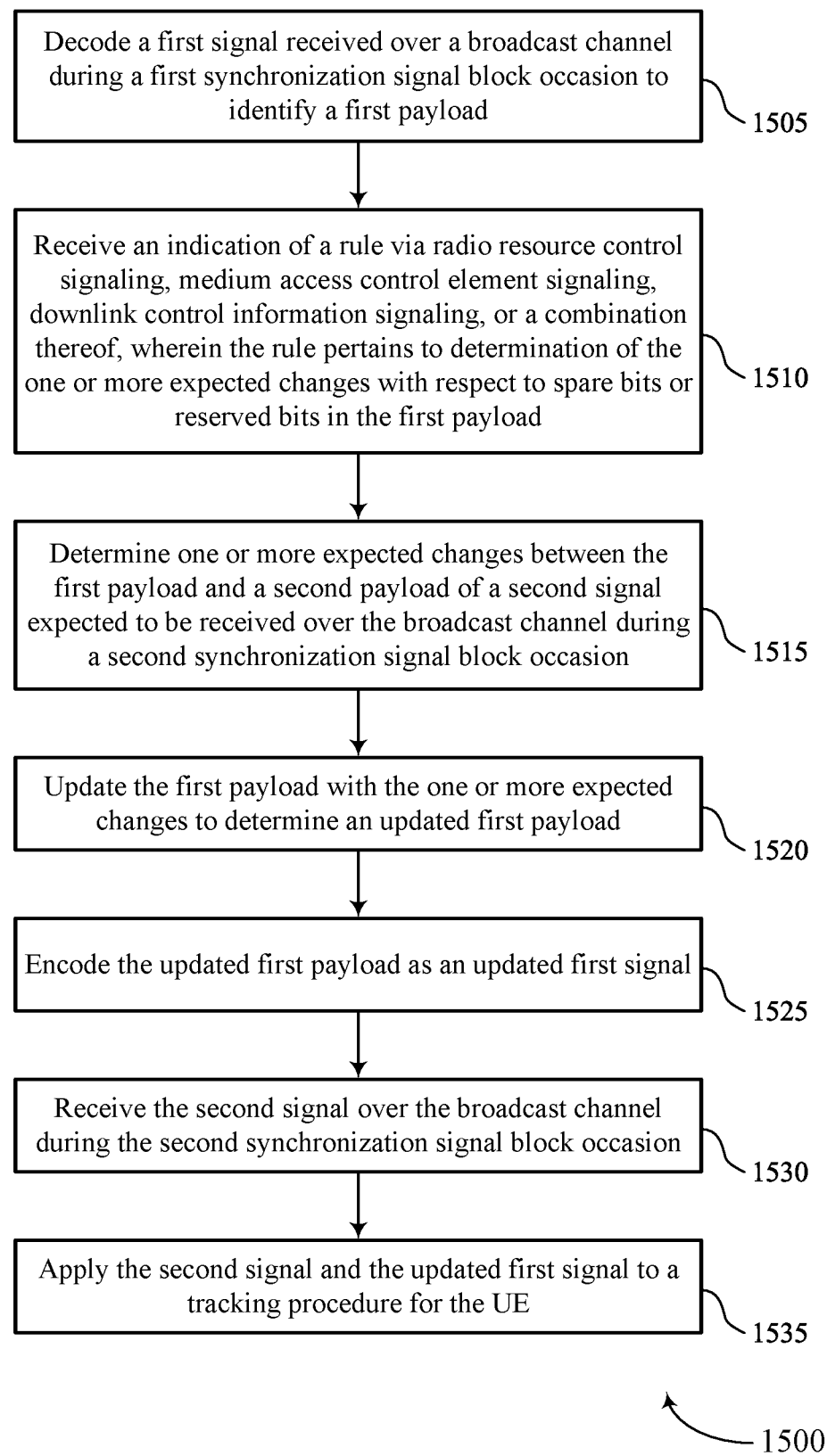

FIG. 15 shows a flowchart illustrating a method 1500 that supports techniques for performing tracking using a PBCH in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include decoding a first signal received over a broadcast channel during a first SSB occasion to identify a first payload. The operations of 1505 may be performed in accordance with examples as disclosed herein. In some examples, aspects of the operations of 1505 may be performed by a signal decoding manager 825 as described with reference to FIG. 8.

At 1510, the method may include receiving an indication of a rule via radio resource control signaling, medium access control element signaling, downlink control information signaling, or a combination thereof, where the rule pertains to determination of the one or more expected changes with respect to spare bits or reserved bits in the first payload. The operations of 1510 may be performed in accordance with examples as disclosed herein. In some examples, aspects of the operations of 1510 may be performed by a payload change rule manager 855 as described with reference to FIG. 8.

At 1515, the method may include determining one or more expected changes between the first payload and a second payload of a second signal expected to be received over the broadcast channel during a second SSB occasion. The operations of 1515 may be performed in accordance with examples as disclosed herein. In some examples, aspects of the operations of 1515 may be performed by a payload change determination manager 830 as described with reference to FIG. 8.

At 1520, the method may include updating the first payload with the one or more expected changes to determine an updated first payload. The operations of 1520 may be performed in accordance with examples as disclosed herein. In some examples, aspects of the operations of 1520 may be performed by a payload updating manager 835 as described with reference to FIG. 8.

At 1525, the method may include encoding the updated first payload as an updated first signal. The operations of 1525 may be performed in accordance with examples as disclosed herein. In some examples, aspects of the operations of 1525 may be performed by a payload encoding manager 840 as described with reference to FIG. 8.

At 1530, the method may include receiving the second signal over the broadcast channel during the second SSB occasion. The operations of 1530 may be performed in accordance with examples as disclosed herein. In some examples, aspects of the operations of 1530 may be performed by a signal reception manager 845 as described with reference to FIG. 8.

At 1535, the method may include applying the second signal and the updated first signal to a tracking procedure for the UE. The operations of 1535 may be performed in accordance with examples as disclosed herein. In some examples, aspects of the operations of 1535 may be performed by a tracking procedure manager 850 as described with reference to FIG. 8.

Figure 16:
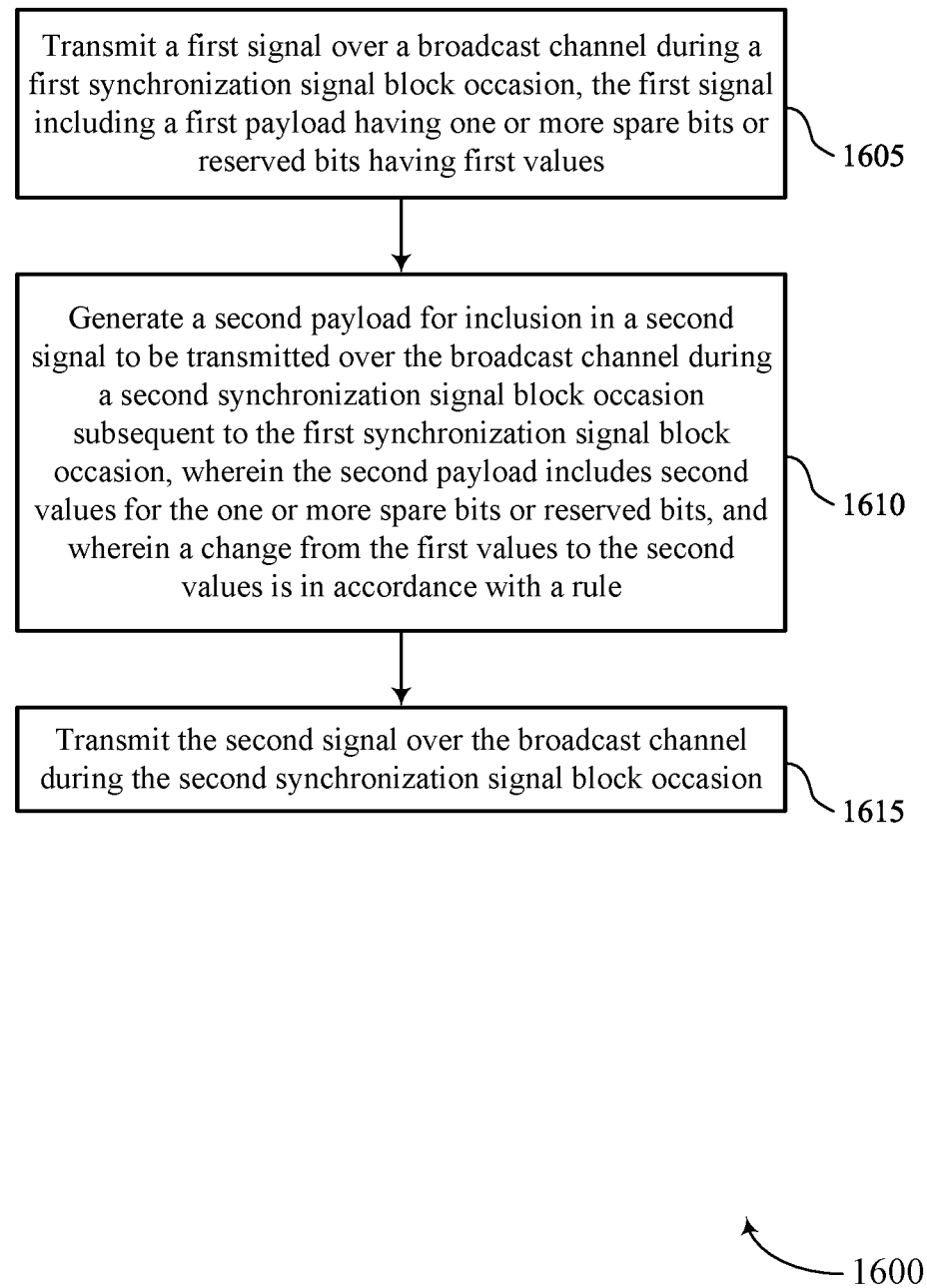

FIG. 16 shows a flowchart illustrating a method 1600 that supports techniques for performing tracking using a PBCH in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting a first signal over a broadcast channel during a first SSB occasion, the first signal including a first payload having one or more spare bits or reserved bits having first values. The operations of 1605 may be performed in accordance with examples as disclosed herein. In some examples, aspects of the operations of 1605 may be performed by a signal transmission component 1225 as described with reference to FIG. 12.

At 1610, the method may include generating a second payload for inclusion in a second signal to be transmitted over the broadcast channel during a second SSB occasion subsequent to the first SSB occasion, where the second payload includes second values for the one or more spare bits or reserved bits, and where a change from the first values to the second values is in accordance with a rule. The operations of 1610 may be performed in accordance with examples as disclosed herein. In some examples, aspects of the operations of 1610 may be performed by a payload generation component 1230 as described with reference to FIG. 12.

At 1615, the method may include transmitting the second signal over the broadcast channel during the second SSB occasion. The operations of 1615 may be performed in accordance with examples as disclosed herein. In some examples, aspects of the operations of 1615 may be performed by a payload transmission component 1235 as described with reference to FIG. 12.

Figure 17:
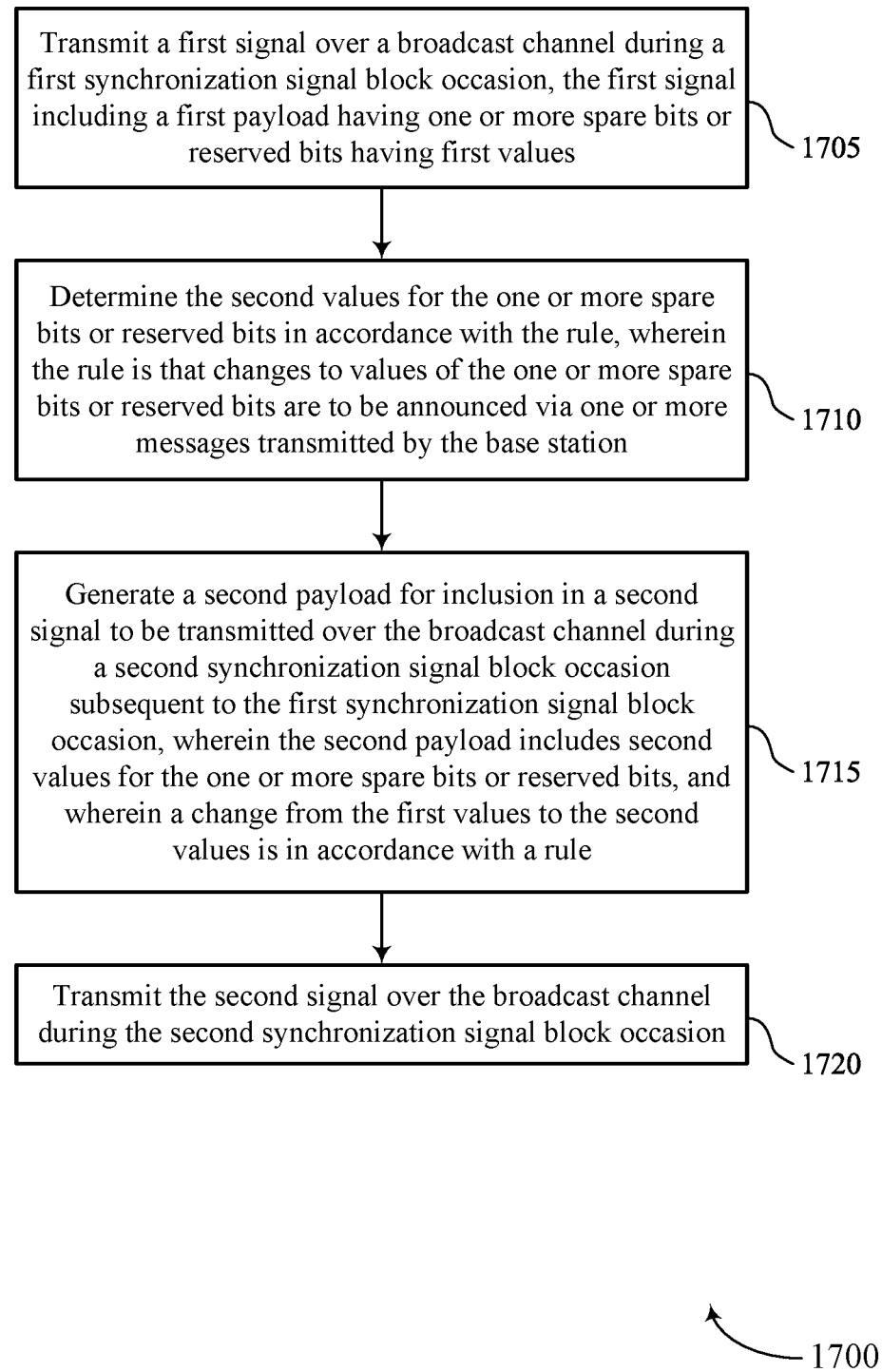

FIG. 17 shows a flowchart illustrating a method 1700 that supports techniques for performing tracking using a PBCH in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting a first signal over a broadcast channel during a first SSB occasion, the first signal including a first payload having one or more spare bits or reserved bits having first values. The operations of 1705 may be performed in accordance with examples as disclosed herein. In some examples, aspects of the operations of 1705 may be performed by a signal transmission component 1225 as described with reference to FIG. 12.

At 1710, the method may include determining the second values for the one or more spare bits or reserved bits in accordance with the rule, where the rule is that changes to values of the one or more spare bits or reserved bits are to be announced via one or more messages transmitted by the base station. The operations of 1710 may be performed in accordance with examples as disclosed herein. In some examples, aspects of the operations of 1710 may be performed by a payload generation component 1230 as described with reference to FIG. 12.

At 1715, the method may include generating a second payload for inclusion in a second signal to be transmitted over the broadcast channel during a second SSB occasion subsequent to the first SSB occasion, where the second payload includes second values for the one or more spare bits or reserved bits, and where a change from the first values to the second values is in accordance with a rule. The operations of 1715 may be performed in accordance with examples as disclosed herein. In some examples, aspects of the operations of 1715 may be performed by a payload generation component 1230 as described with reference to FIG. 12.

At 1720, the method may include transmitting the second signal over the broadcast channel during the second SSB occasion. The operations of 1720 may be performed in accordance with examples as disclosed herein. In some examples, aspects of the operations of 1720 may be performed by a payload transmission component 1235 as described with reference to FIG. 12.

The following provides an overview of aspects of the present disclosure:

Aspect 1: A method for wireless communications at a UE, comprising: decoding a first signal received over a broadcast channel during a first synchronization signal block occasion to identify a first payload; determining one or more expected changes between the first payload and a second payload of a second signal expected to be received over the broadcast channel during a second synchronization signal block occasion; updating the first payload with the one or more expected changes to determine an updated first payload; encoding the updated first payload as an updated first signal; receiving the second signal over the broadcast channel during the second synchronization signal block occasion; and applying the second signal and the updated first signal to a tracking procedure for the UE.

Aspect 2: The method of aspect 1, wherein determining the one or more expected changes further comprises: determining the one or more expected changes with respect to spare bits or reserved bits in the first payload in accordance with a rule.

Aspect 3: The method of aspect 2, wherein determining the one or more expected changes with respect to spare bits or reserved bits in the first payload further comprises: receiving a message, in accordance with the rule, indicating new values of the spare bits or reserved bits, the new values to be included in the second payload and representative of the one or more expected changes with respect to spare bits or reserved bits.

Aspect 4: The method of any of aspects 2 through 3, wherein determining the one or more expected changes with respect to spare bits or reserved bits in the first payload further comprises: predicting, in accordance with the rule, new values of the spare bits or reserved bits, the new values to be included in the second payload and representative of the one or more expected changes with respect to spare bits or reserved bits.

Aspect 5: The method of aspect 4, wherein the rule requires that changes with respect to spare bits or reserved bits in broadcast channels of subsequent synchronization signal block occasions be predictable.

Aspect 6: The method of any of aspects 1 through 5, wherein determining the one or more expected changes further comprises: determining that values of spare bits or reserved bits do not change from the first payload to the second payload as a result of the first payload and the second payload being within a same periodic time interval and in accordance with a rule wherein the values of spare bits or reserved bits in broadcast channels of synchronization signal blocks are only allowed to change at a beginning of a periodic time interval.

Aspect 7: The method of aspect 6, wherein decoding the first signal further comprises: determining that the first synchronization signal block occasion occurs at an initial boundary of the periodic time interval; and decoding the first signal received during the first synchronization signal block occasion based at least in part on the first synchronization signal block occasion occurring at the initial boundary of the periodic time interval in accordance with the rule.

Aspect 8: The method of any of aspects 6 through 7, further comprising: determining that the second synchronization signal block occasion occurs after the first synchronization signal block occasion but within the periodic time interval; and refraining from decoding the second signal received during the second synchronization signal block occasion based at least in part on the second synchronization signal block occasion occurring after the first synchronization signal block occasion but within the periodic time interval in accordance with the rule.

Aspect 9: The method of any of aspects 1 through 8, further comprising: receiving an indication of a rule via radio resource control signaling, medium access control element signaling, downlink control information signaling, or a combination thereof, wherein the rule pertains to determination of the one or more expected changes with respect to spare bits or reserved bits in the first payload.

Aspect 10: The method of any of aspects 1 through 9, further comprising: identifying a rule that pertains to determination of the one or more expected changes with respect to spare bits or reserved bits in the first payload, wherein the UE is preconfigured with the rule.

Aspect 11: The method of any of aspects 1 through 10, wherein the tracking procedure is a frequency tracking loop procedure, a time tracking loop procedure, a projected energy tracking procedure, a power delay profile estimation procedure, a doppler spread estimation procedure, a delay spread estimation procedure, or a combination thereof.

Aspect 12: A method for wireless communications at a base station, comprising: transmitting a first signal over a broadcast channel during a first synchronization signal block occasion, the first signal including a first payload having one or more spare bits or reserved bits having first values; generating a second payload for inclusion in a second signal to be transmitted over the broadcast channel during a second synchronization signal block occasion subsequent to the first synchronization signal block occasion, wherein the second payload includes second values for the one or more spare bits or reserved bits, and wherein a change from the first values to the second values is in accordance with a rule; and transmitting the second signal over the broadcast channel during the second synchronization signal block occasion.

Aspect 13: The method of aspect 12, wherein generating the second payload further comprises: determining the second values for the one or more spare bits or reserved bits in accordance with the rule, wherein the rule is that changes to values of the one or more spare bits or reserved bits are to be announced via one or more messages transmitted by the base station.

Aspect 14: The method of aspect 13, further comprising: transmitting the one or more messages announcing the changes to the values of the one or more spare bits or reserved bits.

Aspect 15: The method of any of aspects 12 through 14, wherein generating the second payload further comprises: determining the second values for the one or more spare bits or reserved bits in accordance with the rule, wherein the rule is that changes to values of the one or more spare bits or reserved bits between subsequent synchronization system block occasions are to be predictable.

Aspect 16: The method of any of aspects 12 through 15, wherein generating the second payload further comprises: determining the second values for the one or more spare bits or reserved bits in accordance with the rule, wherein the rule is that changes to values of the one or more spare bits or reserved bits only occur at boundaries of periodic time intervals.

Aspect 17: The method of aspect 16, wherein the second values for the one or more spare bits or reserved bits are the first values for the one or more spare bits or reserved bits, as a result of the first synchronization signal block occasion and the second synchronization signal block occasion being both within a same periodic time interval.

Aspect 18: The method of any of aspects 12 through 17, further comprising: transmitting an indication of the rule via radio resource control signaling, medium access control element signaling, downlink control information signaling, or a combination thereof, wherein the rule pertains to determination by a UE of changes between the first values for the one or more spare bits or reserved bits and the second values for the one or more spare bits or reserved bits.

Aspect 19: An apparatus for wireless communications, comprising a processor; memory coupled with the processor; and instructions stored in the memory and executable by the processor to cause the apparatus to perform a method of any of aspects 1 through 11.

Aspect 20: An apparatus for wireless communications, comprising at least one means for performing a method of any of aspects 1 through 11.

Aspect 21: A non-transitory computer-readable medium storing code for wireless communications, the code comprising instructions executable by a processor to perform a method of any of aspects 1 through 11.

Aspect 22: An apparatus for wireless communications, comprising a processor; memory coupled with the processor; and instructions stored in the memory and executable by the processor to cause the apparatus to perform a method of any of aspects 12 through 18.

Aspect 23: An apparatus for wireless communications, comprising at least one means for performing a method of any of aspects 12 through 18.

Aspect 24: A non-transitory computer-readable medium storing code for wireless communications, the code comprising instructions executable by a processor to perform a method of any of aspects 12 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    decoding a first signal received via a broadcast channel during a first synchronization signal block occasion to identify a first payload;
    predicting, prior to receipt of a second signal comprising a second payload, one or more expected changes between the first payload and the second payload, wherein the second signal is expected to be received via the broadcast channel during a second synchronization signal block occasion, wherein the one or more expected changes are between reserved bits in the first payload and reserved bits in the second payload, and wherein the one or more expected changes between the reserved bits in the first payload and the reserved bits in the second payload are indicated by a corresponding change in a half frame number conveyed via the broadcast channel;
    updating the first payload with the one or more expected changes to determine an updated first payload;
    encoding the updated first payload as an updated first signal;
    receiving the second signal via the broadcast channel during the second synchronization signal block occasion; and
    applying the second signal and the updated first signal to a tracking procedure for the UE.

2. The method of claim 1, wherein predicting the one or more expected changes further comprises:
    predicting the one or more expected changes with respect to reserved bits in the first payload in accordance with a rule.

3. The method of claim 2, wherein predicting the one or more expected changes with respect to the reserved bits in the first payload further comprises:
    receiving a message, in accordance with the rule, indicating new values of reserved bits, the second payload to include reserved bits having the new values, the new values representative of the one or more expected changes with respect to the reserved bits in the first payload.

4. The method of claim 2, wherein predicting the one or more expected changes with respect to the reserved bits in the first payload further comprises:
    predicting, in accordance with the rule, new values of reserved bits, the second payload to include reserved bits having the new values, the new values representative of the one or more expected changes with respect to the reserved bits in the first payload.

5. The method of claim 1, wherein predicting the one or more expected changes is further based at least in part on one or more parameters associated with a synchronization signal block (SSB) identifier (ID), a system frame number, or both.

6. The method of claim 1, wherein predicting the one or more expected changes further comprises:
    determining that values of reserved bits do not change from the first payload to the second payload as a result of the first payload and the second payload being within a same periodic time interval and in accordance with a rule, wherein values of reserved bits in broadcast channels of synchronization signal blocks are only allowed to change at a beginning of a periodic time interval.

7. The method of claim 6, wherein decoding the first signal further comprises:
    determining that the first synchronization signal block occasion occurs at an initial boundary of the periodic time interval; and
    decoding the first signal received during the first synchronization signal block occasion based at least in part on the first synchronization signal block occasion occurring at the initial boundary of the periodic time interval in accordance with the rule.

8. The method of claim 6, further comprising:
    determining that the second synchronization signal block occasion occurs after the first synchronization signal block occasion but within the periodic time interval; and
    refraining from decoding the second signal received during the second synchronization signal block occasion based at least in part on the second synchronization signal block occasion occurring after the first synchronization signal block occasion but within the periodic time interval in accordance with the rule.

9. The method of claim 1, further comprising:
    receiving an indication of a rule via radio resource control signaling, medium access control element signaling, downlink control information signaling, or a combination thereof, wherein the rule pertains to determination of the one or more expected changes with respect to the reserved bits in the first payload.

10. The method of claim 1, further comprising:
identifying a rule that pertains to determination of the one or more expected changes with respect to the reserved bits in the first payload, wherein the UE is preconfigured with the rule.

11. The method of claim 1, wherein the tracking procedure is a frequency tracking loop procedure, a time tracking loop procedure, a projected energy tracking procedure, a power delay profile estimation procedure, a doppler spread estimation procedure, a delay spread estimation procedure, or a combination thereof.

12. A method for wireless communications at a network entity, comprising:
transmitting a first signal via a broadcast channel during a first synchronization signal block occasion, the first signal including a first payload having one or more reserved bits having first values;
generating a second payload for inclusion in a second signal to be transmitted via the broadcast channel during a second synchronization signal block occasion subsequent to the first synchronization signal block occasion, wherein the second payload includes one or more reserved bits having second values, and wherein a change from the first values to the second values is in accordance with a rule that defines that a corresponding change in a half frame number conveyed via the broadcast channel is indicative of the change from the first values to the second values; and
transmitting the second signal via the broadcast channel during the second synchronization signal block occasion.

13. The method of claim 12, wherein generating the second payload further comprises:
determining the second values for the one or more reserved bits in the second payload in accordance with the rule, wherein the rule is that changes to values of the one or more reserved bits are to be announced via one or more messages transmitted by the network entity.

14. The method of claim 13, further comprising:
transmitting the one or more messages announcing the changes to the values of the one or more reserved bits.

15. The method of claim 12, wherein generating the second payload further comprises:
determining the second values for the one or more reserved bits in the second payload in accordance with the rule, wherein the rule is that changes to values of one or more reserved bits between subsequent synchronization system block occasions are to be predictable.

16. The method of claim 12, wherein generating the second payload further comprises:
determining the second values for the one or more reserved bits in the second payload in accordance with the rule, wherein the rule is that changes to values of one or more reserved bits only occur at boundaries of periodic time intervals.

17. The method of claim 16, wherein the second values for the one or more reserved bits in the second payload are the first values for the one or more reserved bits in the first payload, as a result of the first synchronization signal block occasion and the second synchronization signal block occasion both being within a same periodic time interval.

18. The method of claim 12, further comprising:
transmitting an indication of the rule via radio resource control signaling, medium access control element signaling, downlink control information signaling, or a combination thereof, wherein the rule pertains to determination by a user equipment (UE) of changes between the first values for the one or more reserved bits of the first payload and the second values for the one or more reserved bits of the second payload.

19. A user equipment (UE) for wireless communications, comprising:
one or more processors;
one or more memories coupled with the one or more processors; and
instructions stored in the one or more memories and executable by the one or more processors to cause the UE to:
decode a first signal received via a broadcast channel during a first synchronization signal block occasion to identify a first payload;
predict, prior to receipt of a second signal comprising a second payload, one or more expected changes between the first payload and the second payload, wherein the second signal is expected to be received via the broadcast channel during a second synchronization signal block occasion, wherein the one or more expected changes are between reserved bits in the first payload and reserved bits in the second payload, and wherein the one or more expected changes between the reserved bits in the first payload and the reserved bits in the second payload are indicated by a corresponding change in a half frame number conveyed via the broadcast channel;
update the first payload with the one or more expected changes to determine an updated first payload;
encode the updated first payload as an updated first signal;
receive the second signal via the broadcast channel during the second synchronization signal block occasion; and
apply the second signal and the updated first signal to a tracking procedure for the UE.

20. The UE of claim 19, wherein the instructions to predict the one or more expected changes are further executable by the one or more processors to cause the UE to:
predict the one or more expected changes with respect to the reserved bits in the first payload in accordance with a rule.

21. The UE of claim 20, wherein the instructions to predict the one or more expected changes with respect to the reserved bits in the first payload are further executable by the one or more processors to cause the UE to:
receive a message, in accordance with the rule, indicating new values of reserved bits, the second payload to include reserved bits having the new values, the new values representative of the one or more expected changes with respect to the reserved bits in the first payload.

22. The UE of claim 20, wherein the instructions to predict the one or more expected changes with respect to the reserved bits in the first payload are further executable by the one or more processors to cause the UE to:
predict, in accordance with the rule, new values of reserved bits, the second payload to include reserved bits having the new values, the new values representative of the one or more expected changes with respect to the reserved bits in the first payload.

23. The UE of claim 22, wherein the rule further requires that changes with respect to reserved bits in broadcast channels of subsequent synchronization signal block occasions be predictable.

24. The UE of claim 19, wherein the instructions to predict the one or more expected changes are further executable by the one or more processors to cause the UE to:
   determine that values of reserved bits do not change from the first payload to the second payload as a result of the first payload and the second payload being within a same periodic time interval and in accordance with a rule, wherein values of reserved bits in broadcast channels of synchronization signal blocks are only allowed to change at a beginning of a periodic time interval.

25. The UE of claim 24, wherein the instructions to decode the first signal are further executable by the one or more processors to cause the UE to:
   determine that the first synchronization signal block occasion occurs at an initial boundary of the periodic time interval; and
   decode the first signal received during the first synchronization signal block occasion based at least in part on the first synchronization signal block occasion occurring at the initial boundary of the periodic time interval in accordance with the rule.

26. The UE of claim 24, wherein the instructions are further executable by the one or more processors to cause the UE to:
   determine that the second synchronization signal block occasion occurs after the first synchronization signal block occasion but within the periodic time interval; and
   refrain from decoding the second signal received during the second synchronization signal block occasion based at least in part on the second synchronization signal block occasion occurring after the first synchronization signal block occasion but within the periodic time interval in accordance with the rule.

27. The UE of claim 19, wherein the instructions are further executable by the one or more processors to cause the UE to:
   receive an indication of a rule via radio resource control signaling, medium access control element signaling, downlink control information signaling, or a combination thereof, wherein the rule pertains to determination of the one or more expected changes with respect to the reserved bits in the first payload.

28. A network entity for wireless communications, comprising:
   one or more processors;
   one or more memories coupled with the one or more processors; and
   instructions stored in the one or more memories and executable by the one or more processors to cause the network entity to:
   transmit a first signal via a broadcast channel during a first synchronization signal block occasion, the first signal including a first payload having one or more reserved bits having first values;
   generate a second payload for inclusion in a second signal to be transmitted via the broadcast channel during a second synchronization signal block occasion subsequent to the first synchronization signal block occasion, wherein the second payload includes one or more reserved bits having second values, and wherein a change from the first values to the second values is in accordance with a rule that defines that a corresponding change in a half frame number conveyed via the broadcast channel is indicative of the change from the first values to the second values; and
   transmit the second signal via the broadcast channel during the second synchronization signal block occasion.

29. The network entity of claim 28, wherein the instructions to generate the second payload are further executable by the one or more processors to cause the network entity to:
   determine the second values for the one or more reserved bits in the second payload in accordance with the rule, wherein the rule is that changes to values of one or more reserved bits are to be announced via one or more messages transmitted by the network entity.

30. The network entity of claim 28, wherein the instructions to generate the second payload are further executable by the one or more processors to cause the network entity to:
   determine the second values for the one or more reserved bits in the second payload in accordance with the rule, wherein the rule is that changes to values of one or more reserved bits between subsequent synchronization system block occasions are to be predictable.

* * * * *